(12) United States Patent
Klimer

(10) Patent No.: US 9,042,472 B2
(45) Date of Patent: May 26, 2015

(54) MIMO DECODING SYSTEM AND METHOD

(76) Inventor: Gideon J. Klimer, Holon (IL)

( * ) Notice: Subject to any disclaimer, the term of this patent is extended or adjusted under 35 U.S.C. 154(b) by 778 days.

(21) Appl. No.: 12/526,950

(22) PCT Filed: Feb. 18, 2008

(86) PCT No.: PCT/IL2008/000209
§ 371 (c)(1),
(2), (4) Date: Jan. 11, 2010

(87) PCT Pub. No.: WO2008/099411
PCT Pub. Date: Aug. 21, 2008

(65) Prior Publication Data
US 2011/0096858 A1    Apr. 28, 2011

(30) Foreign Application Priority Data
Feb. 18, 2007  (IL) .......................................... 181398

(51) Int. Cl.
*H04B 7/02* (2006.01)
*H04B 7/08* (2006.01)
*H04L 1/06* (2006.01)
*H04L 25/03* (2006.01)

(52) U.S. Cl.
CPC ............... *H04B 7/0854* (2013.01); *H04L 1/06* (2013.01); *H04L 1/0618* (2013.01); *H04L 2025/03426* (2013.01)

(58) Field of Classification Search
USPC .......... 375/341, 347, 262, 265, 267, 316, 349
See application file for complete search history.

(56) References Cited

U.S. PATENT DOCUMENTS

| | | | | |
|---|---|---|---|---|
| 7,720,181 B2* | 5/2010 | Park et al. | ...................... | 375/341 |
| 7,746,950 B2* | 6/2010 | Kim et al. | ...................... | 375/267 |
| 7,746,951 B2* | 6/2010 | Hwang et al. | ................. | 375/267 |
| 7,826,571 B2* | 11/2010 | Kim et al. | ...................... | 375/347 |
| 7,864,896 B2* | 1/2011 | Hwang et al. | ................. | 375/341 |

(Continued)

OTHER PUBLICATIONS

Hozun Sung, Kwang Bok (Ed) Lee and Jee Woong Kang, "A simplified maximum likelihood detection scheme for MIMO systems", Oct. 6-9, 2003, Vehicular Technology Conference, 2003. VTC 2003—Fall. 2003 IEEE 58th.*

(Continued)

*Primary Examiner* — Santiago Garcia
(74) *Attorney, Agent, or Firm* — Smith Risley Tempel Santos LLC; Gregory Scott Smith

(57) ABSTRACT

A method for decoding Spatial-Multiplexing MIMO in a system with 2 transmit (Tx) antennas, comprising: A. The baseband signal model is written using vector-notation, wherein, in the case of a system with 2 Tx antennas, the equation can be written with separated channel-matrix columns; B. For all M possibilities of the first symbol vector-element component s1 in vector s, calculate the following M vector values; C. For the vectors Gi calculated in Step (B), calculate Zero-Forcing or MMSE values. D. For the vectors Si, calculated in Step (C), find the one that attains the minimum value of the Euclidean vector norm of the error.

12 Claims, 4 Drawing Sheets

(56) References Cited

U.S. PATENT DOCUMENTS

| | | | |
|---|---|---|---|
| 7,907,912 B2* | 3/2011 | Nam et al. | 455/69 |
| 7,907,913 B2* | 3/2011 | Lee et al. | 455/69 |
| 7,978,798 B2* | 7/2011 | Hwang et al. | 375/349 |
| 8,027,401 B2* | 9/2011 | Hwang et al. | 375/267 |
| 8,054,904 B2* | 11/2011 | Hwang et al. | 375/267 |
| 2007/0032206 A1* | 2/2007 | Hwang et al. | 455/101 |
| 2007/0127589 A1* | 6/2007 | Hwang et al. | 375/267 |
| 2007/0133709 A1* | 6/2007 | Park et al. | 375/267 |
| 2007/0155336 A1* | 7/2007 | Nam et al. | 455/69 |
| 2007/0206626 A1* | 9/2007 | Lee et al. | 370/437 |
| 2007/0230609 A1* | 10/2007 | Hwang et al. | 375/267 |
| 2007/0297496 A1* | 12/2007 | Park et al. | 375/148 |
| 2008/0279298 A1* | 11/2008 | Ben-Yishai et al. | 375/261 |

OTHER PUBLICATIONS

Hozun Sung, Kwang Bok (Ed) Lee and Jee Woong Kang, "A simplified maximum likelihood detection scheme for MIMO systems", Oct. 6-9, 2003, Vehicular Technology Conference, 2003. VTC 2003—Fall. 2003 IEEE 58$^{th}$.*

Keun Chul Hwang, Sungwoo Park, Moon June and Soon Young Yoon, "Iterative Joint Detection and Decoding for MIMO-OFDM Wireless Communications", Oct. 29, 2006-Nov. 1, 2006, Signals, Systems and Computers, 2006. ACSSC '06.*

* cited by examiner

Phase 0:
It is necessary to decide which of the symbols s1, s2, s3, s4 shall be the "main symbol", whose index shall be denoted by k or imain. This decision is performed according to one of the following criteria:

Criterion Alternative 1:

$$k = j_{main} = \arg\max_{j=1,\ldots,4} \{\det(\mathbf{H}_j^H \cdot \mathbf{H}_j)\} \qquad \det(\ ) \text{ is the matrix determinant}$$

Criterion Alternative 2:

$$k = j_{main} = \arg\min_{j=1,\ldots,4} \{\|\mathbf{h}_j\|^2\} \qquad \|\mathbf{h}_j\|^2 = \mathbf{h}_j^H \cdot \mathbf{h}_j$$

Phase 1:
For all $M$ possibilities of the "main symbol" vector-element component $s_k$ in vector s (for example, 64-QAM has $M = 64$), calculate the following $M$ vector values:
$$\mathbf{g}_i = \mathbf{g}(s_k(i)) = \mathbf{y} - \mathbf{h}_k \cdot s_k(i), \qquad i = 1,\ldots, M$$

Phase 2:
For the vectors $\mathbf{g}_i$ calculated in Phase 1, calculate:

Zero - Forcing: $\hat{\mathbf{s}}_{without\ k}(i) = (\mathbf{H}_k^H \cdot \mathbf{H}_k)^{-1} \cdot \mathbf{H}_k^H \cdot \mathbf{g}_i, \qquad i = 1,\ldots,M$ or:

MMSE: $\hat{\mathbf{s}}_{without\ k}(i) = (\mathbf{H}_k^H \cdot \mathbf{H}_k + \sigma^2 \mathbf{I})^{-1} \cdot \mathbf{H}_k^H \cdot \mathbf{g}_i, \qquad i = 1,\ldots,M$ $\mathbf{s}_{without\ k}(i) = HardDecision(\hat{\mathbf{s}}_{without\ k}(i))$ $\mathbf{s}_i$ is a vector created from the main symbol $s_k(i)$, and the symbol vector - element components within the vector $\mathbf{s}_{without\ k}(i)$, such that each symbol vector - element component will occupy its correct position within the vector $\mathbf{s}_i$.
There are $M$ vectors $\mathbf{s}_i$ ($i = 1,\ldots,M$)

Phase 3:
This phase (Phase 3 in the case of more than 2 Tx antennas) is identical to Phase 3 in the case of 2 Tx antennas.

FIG. 4

MIMO DECODING SYSTEM AND METHOD

CROSS REFERENCE TO RELATED APPLICATIONS

This United States non-provisional application for patent is a national application being filed under 35 U.S.C. 371 and claiming the benefit of and priority to Israeli application serial number 181398 filed on 18 Feb. 2007, through the Patent Cooperation Treaty Filing having an international publication number of WO2008/099411 (PCT/IL2008/000209) and having an international filing date of 18 Feb. 2008.

The present invention relates to a spatial-multiplexing MIMO decoding system and method.

PMLMS™—a novel methods for decoding Spatial-Multiplexing MIMO, is claimed as trademark by the present applicant.

BACKGROUND OF THE INVENTION

The present invention relates to MIMO (Multiple-Input, Multiple-Output) communication links. These are communication systems which use several (more than one) transmit (Tx) antennas, and several (more than one) receive (Rx) antennas. The purpose of using MIMO compared to a single antenna for Tx and Rx, is to improve the performance of a communication channel, without increasing the allocated bandwidth.

A problem in MIMO systems is the signal decoding at the receiver. Simple implementations have rather low performance, whereas high performance requires complex, more expensive implementations.

The problem addressed with the present invention relates to an efficient decoding method for the received signals, that is estimating the transmitted signals from the received signals and with a knowledge of the scattering matrix H.

Existing Decoding Methods (Prior Art)

Consider the following existing types of MIMO decoding methods (prior art):

1. Maximum-Likelihood (ML): This is the optimum (best performance) decoding method, but is generally impractical. This method searches all possibilities for all symbols s1, s2, .... In general terms, the computational complexity grows exponentially with the number of Tx antennas and polynomially with the constellation size: $O(M^n)$, where n is the number of Tx antennas and M is the size of the constellation (the signaling alphabet). For example, when there are 2 Tx antennas, as illustrated in FIG. 1 and Equation 4: when using QPSK there are $4^2=16$ possibilities; when using 16-QAM there are $16^2=256$ possibilities; however, when using 64-QAM there are $64^2=4096$ possibilities, which ceases to be practical due to the large computational complexity (number of calculations). As a $2^{nd}$ example, when there are 4 Tx antennas: even 16-QAM ceases to be practical, because there are $16^4=65536$ possibilities; moreover, when using 64-QAM there are $64^4=16777216$ possibilities; both 16-QAM and 64-QAM have enormous computational complexity (number of calculations) when there are 4 Tx antennas.

2. Sphere-Decoding (an approximation to ML): Search only a subset of the possible parameter-space, usually a sphere or paraboloid in an n-dimensional complex subspace over real and imaginary integers, or equivalently, a 2n-dimensional subspace over integers, where n is the number of Tx antennas. There are various ways to determine the reduced search parameter-space subset, in order to reduce the search size and computations as much as possible, while still achieving a solution that is equal to the Maximum-Likelihood (ML) solution. See [3] and the references therein for an extensive review and description of the current state-of-the-art of Sphere Decoding.

3. Zero-Forcing (also called Decorrelation): Basically, this is a Least-Squares pseudo-inversion when the channel-matrix is rectangular, or a direct matrix inversion when the channel-matrix is square. Generally, this method provides very poor performance due to noise-amplification because some of the channel matrix elements, which are "poor", can cause deterioration of the whole decoding. However, the benefit of this method is its relatively low computational complexity (small number of calculations).

4. Full or Partial MMSE (minimum mean-square error): Take into consideration the noise (and possibly self-interference), in order to reduce or eliminate the noise-amplification found in Zero-Forcing, however, the performance is less than the optimum Maximum-Likelihood (ML) method. There are 2 methods for doing this: (1) Perform MMSE over the full channel matrix; (2) Perform partial MMSE, by treating some of the matrix columns as self-interference, and take them into account in the decoding process. Generally, the MMSE methods have a small performance advantage over Zero-Forcing. A similar but better method is MMSE with Interference Cancellation (the idea of Successive Interference Cancellation is described in [2]).

5. Turbo-MIMO (jointly with FEC decoding): An iterated version of MMSE with Interference Cancellation, where MIMO decoding is performed jointly with FEC decoding (FEC=forward-error correction code, either Convolutional, or Turbo-Code, or LDPC).

Following are the descriptions of some of these methods:
Zero-Forcing (Decorrelation)

This method is a Least-Squares pseudo-inversion when the channel-matrix is rectangular, or a direct matrix inversion when the channel-matrix is rectangular. Generally, this method provides very poor performance. The benefit of this method is its relatively low computational complexity (small number of calculations).

The equations for Zero-Forcing (Decorrelation) decoding are:

When H is rectangular m×12, with m>n (more Rx antennas than Tx antennas):

Zero-Forcing (Decorrelation) Method      Equation 1

Implementation 1:

$\hat{s}_{ZF} = (H^H \cdot H)^{-1} \cdot H^H \cdot y$ is the Zero-Forcing solution When $H$ is square, $m = n$ (same number of $Rx$ and $Tx$ antennas)

a simplification is:

$\hat{s}_{ZF} = H^{-1} \cdot y$ is the Zero-Forcing solution $s_{ZF} = HardDecision(\hat{s}_{ZF})$ Implementation 2:

$Q, R$ are the $QR$-decomposition of $H$:

$H = Q \cdot R$, $Q^H \cdot Q = I$, $R$ is upper-triangular $\hat{s}_{ZF} = R^{-1} \cdot (Q^H \cdot y)$ is the Zero-Forcing solution $R^{-1}$ is performed using back-substitution $s_{ZF} = HardDecision(\hat{s}_{ZF})$ Implementation 3:

$U, D, V$ are the SVD of $H$:

$H = U \cdot D \cdot V^H$, $U^H \cdot U = I$, $V^H \cdot V = I$ $D$ is diagonal and *pos.def.*

$D = \text{diag}(\sigma_1, \sigma_2, \ldots, \sigma_n), \sigma_i \geq 0$ $\hat{s}_{ZF} = V \cdot D^{-1} \cdot (U^H \cdot y)$ is the Zero-Forcing solution $s_{ZF} = HardDecision(\hat{s}_{ZF})$ It is well-known from matrix analysis literature that better numerical accuracy, stability, and sometimes lower computation complexity may be obtained by using various matrix-decomposition methods. For example, the QR-decomposition method is shown in Implementation 2; the SVD (singular-value decomposition) method is shown in Implementation 3.

In the equations above, s=HardDecision(ŝ) means: Given an input vector-point ŝ, which is any vector-point with contiguous values, find the closest vector-point s whose vector-element components belong to the constellations (the signaling alphabets) of each of the vector-element components. (The constellation of each of the vector-element components has a discrete set of finite number of values, for example: QPSK, 16-QAM, 64-QAM, etc.) This operation is well-known in the communications literature.

Note that, in order to prepare the decoded symbols for subsequent FEC decoding (FEC=forward-error correction code, either Convolutional, or Turbo-Code, or LDPC), it is usually necessary to create LLR (log-likelihood ratio) values, or other soft-decision metrics, which indicate the confidence level for each bit in the decoded symbols. This operation is well-known in the communications literature. This operation is a subsequent and separate processing step.

Full-MMSE (Minimum Mean-Square Error)

This method uses minimum mean-square error estimation (for both rectangular and square channel-matrix) using the full channel-matrix. Generally, this method provides slightly better performance compared to Zero-Forcing, however, the performance is not as good as the optimum Maximum-Likelihood (ML) method.

The equations for full-MMSE decoding are:

When $H$ is any rectangular m×n or square matrix, and $\sigma^2$ the noise+interference variance (power) (with any compensation factor):

Equation 2: Full-*MMSE* Method

Implementation 1:

$\hat{s}_{MMSE} = H^H \cdot (H \cdot H^H + \sigma^2 I_m)^{-1} \cdot y$ is the full-*MMSE* solution $s_{MMSE} = HardDecision(\hat{s}_{MMSE})$ Implementation 2:

$\hat{s}_{MMSE} = (H^H \cdot H^H + \sigma^2 I_n)^{-1} \cdot H^H \cdot y$ is the full-*MMSE* solution $s_{MMSE} = HardDecision(\hat{s}_{MMSE})$ Implementation 3:

$C$ is the Cholesky factorization of $(H^H \cdot H + \sigma^2 I_n)$:

$(H^H \cdot H + \sigma^2 I_n) = C^H \cdot C,\quad C$ is upper-triangular $\hat{s}_{MMSE} = C^{-1} \cdot (C^{-H} \cdot (H^H \cdot y))$ is the full-*MMSE* solution $C^{-1}$ is performed using back-substitution $s_{MMSE} = HardDecision(\hat{s}_{MMSE})$ Implementation 4:

$U, D, V$ are the SVD of $H$:

$H = U \cdot D \cdot V^H, U^H \cdot U = I$, $V^H \cdot V = I$  $D$ is diagonal and *pos.def.*

$D = \text{diag}(\sigma_1, \sigma_2, \ldots, \sigma_n), \sigma_i \geq 0$ $Z = (D^2 + \sigma^2 I_n)^{-1} \cdot D = \text{diag}\left(\dfrac{\sigma_1}{\sigma_1^2 + \sigma^2}, \dfrac{\sigma_2}{\sigma_2^2 + \sigma^2}, \ldots, \dfrac{\sigma_n}{\sigma_n^2 + \sigma^2}\right)$ $\hat{s}_{MMSE} = V \cdot Z \cdot (U^H \cdot y)$ is the full-*MMSE* solution $s_{MMSE} = HardDecision(\hat{s}_{MMSE})$ When H is a rectangular m×n matrix, with m>n (more Rx antennas than Tx antennas), Implementation 1 implies an m×m matrix inversion. However, it is well-known from matrix analysis literature that the processing may be reduced such that only an n×n matrix inversion is required, as indicated by Implementation 2. It is well-known from matrix analysis literature that better numerical accuracy, stability, and sometimes lower computation complexity may be obtained by using various matrix-decomposition methods. For example, the Cholesky factorization method is shown in Implementation 3; the SVD (singular-value decomposition) method is shown in Implementation 4.

In the equations above, s=HardDecision(ŝ) means: Given an input vector-point ŝ, which is any vector-point with contiguous values, find the closest vector-point s whose vector-element components belong to the constellations (the signaling alphabets) of each of the vector-element components. (The constellation of each of the vector-element components has a discrete set of finite number of values, for example: QPSK, 16-QAM, 64-QAM, etc.) This operation is well-known in the communications literature.

Note that, in order to prepare the decoded symbols for subsequent FEC decoding (FEC=forward-error correction code, either Convolutional, or Turbo-Code, or LDPC), it is usually necessary to create LLR (log-likelihood ratio) values, or other soft-decision metrics, which indicate the confidence level for each bit in the decoded symbols. This operation is well-known in the communications literature. This operation is a subsequent and separate processing step.

Maximum-Likelihood (ML)

This is the optimum (best performance) decoding method, but is generally impractical. This method searches all possibilities for all symbols s1, s2, to find the minimum value of the Euclidean vector norm of the error. Mathematically, the Maximum-Likelihood (ML) method can be written as:

Maximum-Likelihood (ML) Method     Equation 3

$$s_{ML} = \arg\min_s\{\|y - H\cdot s\|^2\}$$

is the Maximum-Likelihood solution
where $\|\bullet\|^2$ is the squared Euclidean vector norm:
$\|v\|^2 = v^H \cdot v$ is real and non-negative
and $\arg\min_s\{\ \}$ means:
to search for the minimum
over all possibilities of the vector s.

The computational complexity grows exponentially with the number of Tx antennas and polynomially with the constellation size: $O(M^n)$, where n is the number of Tx antennas and M is the size of the constellation (the signaling alphabet): QPSK has M=4, 64-QAM has M=64, etc.

In the equation above, the decoded vector-point $s_{ML}$ already consists of vector-element components that belong to the constellations (the signaling alphabets) of each of the vector-element components. (The constellation of each of the vector-element components has a discrete set of finite number of values, for example: QPSK, 16-QAM, 64-QAM, etc.)

Note that in order to prepare the decoded symbols for subsequent FEC decoding (FEC=forward-error correction code, either Convolutional, or Turbo-Code, or LDPC), it is usually necessary to create LLR (log-likelihood ratio) values, or other soft-decision metrics, which indicate the confidence level for each bit in the decoded symbols. This operation is well-known in the communications literature. This operation is a subsequent and separate processing step.

SUMMARY OF THE INVENTION

An innovative method for decoding Spatial-Multiplexing MIMO is disclosed.

The new method achieves improved performance while using a MIMO system of lower complexity with respect to prior art methods and systems.

The new decoding method is also applicable to Collaborative MIMO (which is a special case of Spatial-Multiplexing).

The invention is generally illustrated, by way of example, with two embodiments, one for a system with two transmit antennas and the other for a system with more than two transmit antennas.

Benefits of the new method include, inter alia:
1. For a Spatial-Multiplexing system that has 2 Tx antennas, the decoding performance is optimum (best performance), i.e., it achieves a solution that is equal to the Maximum-Likelihood (ML) solution. (It is understood that this performance is valid for a system with any number of Rx antennas.)
2. For a Spatial-Multiplexing system that has more than 2 Tx antennas (e.g., 3 to 8 Tx antennas), its decoding performance is less than the optimum Maximum-Likelihood (ML) performance, but much better than that of the Full-MMSE or Zero-Forcing (Decorrelation) methods. As the number of Tx antennas increases above 2, the performance decreases compared to ML (and the performance advantage compared to Full-MMSE or Zero-Forcing decreases). However, practical systems use a relatively low number of Tx antennas, e.g., usually not more than 4 Tx antennas, and for these cases, the performance of the current invention is only slightly less than ML, but still better than the Full-MMSE or Zero-forcing methods. (It is understood that this performance is valid for a system with any number of Rx antennas.)
3. The computational complexity (number of calculations) is substantially less than that of the Maximum-Likelihood (ML) method. In general terms, for 2 Tx antennas the computational complexity grows linearly with the number of Tx antennas and linearly with the constellation size: O(nM), and for more than 2 Tx antennas the computational complexity grows with the cube of the number of Tx antennas and linearly with the constellation size: $O(n^3M)$, where n is the number of Tx antennas and M is the size of the constellation (the signaling alphabet): QPSK has M=4, 64-QAM has M=64, etc. Compare this to the computational complexity of ML, which is: $O(M^n)$.

BRIEF DESCRIPTION OF THE DRAWINGS

FIG. 4 details a decoding method suitable for a system with more than two transmit antennas.

DESCRIPTION OF THE PREFERRED EMBODIMENTS

Figure 1:
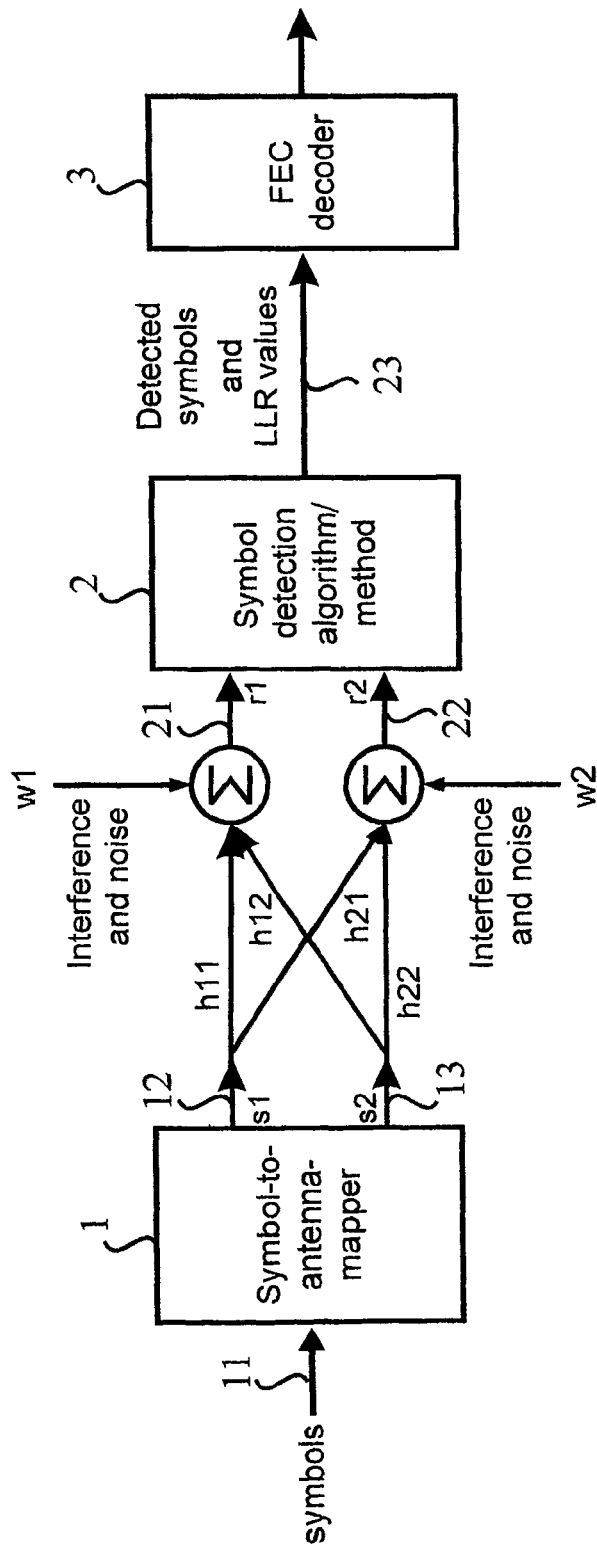
FIG. 1 illustrates a baseband signal model for 2×2 Spatial-Multiplexing MIMO

Definitions of the terms MIMO, Tx, Rx, STC, Spatial-Multiplexing, Collaborative MEMO, etc., can be found below in the present disclosure.

REFERENCES

[1] "IEEE Standard for Local and Metropolitan Area Networks—Part 16: Fixed and Mobile," IEEE Standard 802.16e (Mobile) Corrigendal D12, 14 Oct. 2005.

[2] G. J. Foschini, "Layered Space-Time Architecture for Wireless Communication in a Fading Environment When Using Multi-Element Antennas," *Bell Labs Technical Journal*, vol. 2, pp. 41-59, 1996.

[3] Z. Guo and P. Nilsson, "Algorithm and Implementation of the K-Best Sphere Decoding for MIMO Detection," *IEEE Journal on Selected Areas in Communications*, Vol. 24, No. 3, March 2006.

[4] D. Tse and P. Viswanath, "Fundamentals of Wireless Communications," Cambridge University Press (ISBN 0-521-84527-0), 2005.

DEFINITIONS AND ACRONYMS

Tx: Transmit or transmitter(s).
Rx: Receive or receiver(s).
MIMO: Multiple-input, multiple-output. Communication systems which use several (more than one) Tx antennas, and several (more than one) Rx antennas. The purpose of using MIMO compared to a single antenna for Tx and Rx, is to improve the signal decoding and detection at the receiver (due to the statistics of signal propagation in the physical space), or to increase the transmission data-rate (without increasing the used bandwidth or modulation), or both (improved decoding together with increased data-rate).

STC: Space-Time Coding. Generally, these are various schemes that take advantage of the physical separation between Tx antennas and between Rx antennas, and the statistics of signal propagation in the physical space, to increase the noise-immunity of the transmitted signals.

Spatial Multiplexing/Layered STC: Forms of space-time coding where redundant information is usually not transmitted, and the increase in the noise-immunity of the transmitted signals is due only to the statistics of the highly scattering signal propagation in the physical space, such as in the well-known V-BLAST scheme (see [2]). This is an Open-Loop method; see FIG. 1.

Collaborative MIMO: A specific application of Spatial Multiplexing, where the transmitting antennas belong to different and separate transmitting systems; each separate transmitting system may have only a single Tx antenna. Typically, there is a single common receiving system, which receives the transmissions and decodes them jointly, see FIG. 2, This is a special case of Spatial Multiplexing.

Open-Loop: When the transmitter does not have knowledge of the channels between the Tx and Rx antennas. These methods are suitable for highly mobile scenarios.

Closed-Loop: When the transmitter has knowledge of the channels, either exactly, or in some statistical sense, then the transmitter can use some method of Precoding to create optimal transmission signals. The transmitter can obtain the channel state information either via feedback from the receiver or via reciprocity of the channels in TDD systems. These methods are only suitable in fixed or very low mobility scenarios.

Beamforming: Forms of signal processing, either in the transmitter (Tx-BF) or receiver (Rx-BF) or both (combined-Tx-and-Rx-BF) for creating a directivity gain in the spatial direction of the desired signal(s), and suppression or nulling in the spatial direction of interferers (and noise) and other non-desired signal sources.

MIMO Decoding methods: Methods for decoding the symbols and data sent using any form of MIMO. Existing types of decoding methods (prior art): Maximum-Likelihood (ML), Sphere-Decoding (an approximation to ML), Zero-Forcing (also called Decorrelation), Partial Correlation (Matched Filtering), Full or Partial MMSE (minimum mean-square error), MMSE with Interference Cancellation (IC either Successive (SIC) or Parallel (PIC)), Iterated MMSE with IC, Turbo-MIMO (jointly with FEC decoding).

OFDM: Orthogonal Frequency-Division Multiplexing. Communication method resembling multi-carrier modulation, where each subcarrier is placed as close as possible to its neighboring subcarriers, but is orthogonal to them (and therefore does not interfere with them). The processing for modulating and demodulating is usually performed using IFFT and FFT, respectively (Inverse and direct Fast Fourier Transform, respectively). The complete OFDM symbols are broadband, but each subcarrier observed separately is usually narrowband. This method is used in the communication standard IEEE 802.11a/g.

OFDMA: Orthogonal Frequency-Division Multiple-Access. Communication method similar to OFDM (see above), where the reserved bandwidth is shared between different users; each user is allocated only part (not necessarily all) of the available subcarriers. Different users overlap in time, but not in frequency. It is similar to, and suitable for cellular-type of communications. The complete OFDMA symbols are broadband, but each subcarrier observed separately is usually narrowband. This method is used in the communication standard IEEE 802.16e, see [1].

CDMA: Code-Division Multiple-Access. Communication method based on Direct-Sequence Spread-Spectrum, which uses orthogonal or quasi-orthogonal spreading sequences to separate between different users that share the same reserved bandwidth. Different users overlap in both time as well as frequency, but may be separated using the spreading sequences, since the spreading increases each user's processing gain. It is suitable for cellular-type of communications. The complete CDMA transmission is broadband, but the symbols after de-spreading are narrowband. This method is used in the communication standard WCDMA part of UMTS (also called IMT-2000, an initiative for 3G).

Mathematical Notation

All Greek-letter symbols indicate real (non-complex) scalar numbers (e.g.: $\alpha, \beta, \gamma$).

The English-letter symbols: i, j, k, in, n indicate integers, usually used as index variables.

All other English-letter symbols indicate complex scalars, vectors, or matrices: lower-case non-bold symbols are scalars (e.g.: h,g), lower-case bold symbols are column vectors (e.g.: h, g), upper-case symbols are matrices (e.g.: H, G or H, G).

The notation $(\bullet)^*$ is the complex conjugate (for scalars, vectors, or matrices).

In the notation $(\bullet)^H = ((\bullet)^*)^T$, T is the transpose (without complex conjugation), and H is the Hermitian-transpose (complex conjugate transpose).

Signal Model for Spatial-Multiplexing MIMO

The signal model described herein is a baseband representation, suitable for (but not limited to):

1. A narrowband single-carrier transmission;
2. Each of the subcarriers in OFDM or OFDMA transmitted symbols (the complete OFDM or OFDMA symbols are broadband, but each subcarrier observed separately is narrowband);
3. The symbols of a CDMA transmission after de-spreading (the complete CDMA transmission is broadband, but the symbols after de-spreading are narrowband).

In the communication system types mentioned above, even in a frequency-selective fading-multipath transmission propagation medium, the baseband representation of the channel from each Tx antenna to every Rx antenna will experience flat-frequency fading, so it may be modeled in baseband by a single complex scalar.

Due to the transmission propagation medium characteristics, the received signals at the Rx antennas are also contaminated by undesired interferers, noise, and other non-desired signal sources. These are modeled by an unknown additive noise component, which generally, may be non-white (colored, i.e. correlated), and possibly non-Gaussian (e.g. due to interferers having M-QAM signals). However, the possible correlation between the components is time-variant and unknown.

FIG. 1 illustrates a baseband signal model for 2×2 Spatial-Multiplexing MEMO

The nomenclature "2×2" denotes the dimensions of the channel-matrix consisting of the channel elements $h_1$.

The symbols 11, or data to be transmitted, are divided in unit 1 into data streams to be transmitted by separate antennas. In this example, the symbol-to-antenna mapper 1 separates the data into two streams to be transmitted through transmit antennas 12 and 13.

In other embodiments, more than two transmit antennas may be used.

The transmitted wireless waves travel through space to the receive antennas 21 and 22, two receive antennas in this example, although a different number of receive antennas may be used.

The various paths between the transmit and receive antennas are illustrated, with the scattering matrix (h11, h12, h21, h22) comprised of complex scalars, indicating the path loss and complex phase rotation in each path.

At the receiver, a symbol detection unit 2 may perform a symbol detection algorithm or method. The detected symbols and LLR values 23 may then be further processed in a FEC decoder unit 3.

The problem addressed with the present invention relates to an efficient decoding method for the received signals, that is estimating the transmitted signals (s1, s2 in this example) from the received signals (r1, r2 in this example) and with a knowledge of the scattering matrix H (h11, h12, h21, h22 in this example).

The decoding methods may be implemented, for example, in the unit 2.

Note that in general, the number of Tx antennas and Rx antennas does not need to be the same, which implies that the channel-matrix need not be square, but may be rectangular.

A specific well-known application of Spatial Multiplexing (a special case), is Collaborative MEMO. In this application, the transmitting antennas 12 and 13 belong to different and separate transmitting systems 16 and 17, respectively. Typically, there is a single common receiving system 2, which receives the transmissions and decodes them jointly, see FIG. 2.

In this example, input symbols streams 112 and 113 are transmitted through separate transmitters 16 and 17, respectively.

Receive antennas 21 and 22 at the receiver implement the multiple-receive component of the system.

In other embodiments, more than two transmit antennas may be used.

The transmitted wireless waves travel through space to the receive antennas 21 and 22, two receive antennas in this example, although a different number of receive antennas may be used.

The new decoding methods of the present invention may be implemented, for example, in the unit 2.

Since this is a special case of Spatial Multiplexing, the signal model and subsequent decoding methods can be applied to this application as well.

Notes:
1. It is assumed that the channel elements $h_{ij}$ have already been estimated with "sufficient" accuracy in a previous preliminary processing step, before symbol decoding. This document does not describe that preliminary estimation process.
2. Note that in general, the number of Tx antennas and Rx antennas does not need to be the same, which implies that the channel-matrix need not be square, but may be rectangular.
3. In some system applications, the power transmitted at each Tx antenna is reduced by 1/n according to the total number of Tx antennas, n. For example, in FIG. 1, since there are two Tx antennas, then in some system applications, the power transmitted at each Tx antenna is usually ½ of the total allowed transmit-power P. This is not shown in the drawings, since it is a known gain (attenuation), which is accounted-for during decoding.

Figure 2:
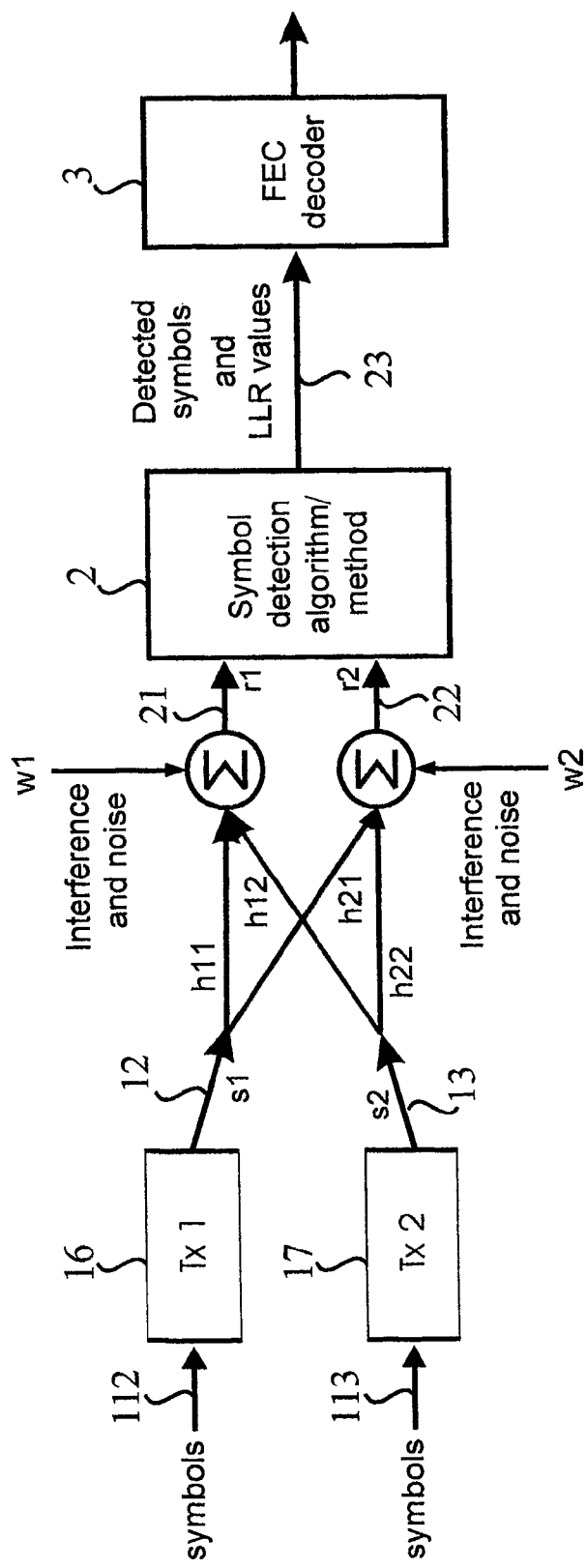
FIG. 2 details a Baseband Signal Model for 2-Tx Collaborative MIMO

Equations of the Baseband Signal Model:

From either FIG. 1 or FIG. 2, considering the equivalent baseband signals $r_1$, $r_2$ received at the Rx antennas at the specific symbol-times, the equations defining the baseband signal model are:

Equation 4

Basebands Signal Model of 2×2 Spatial-Multiplexing *MIMO*

$$\begin{cases} r_1 = h_{11}s_1 + h_{12}s_2 + w_1 \\ r_2 = h_{21}s_1 + h_{22}s_2 + w_2 \end{cases}$$

$$\Leftrightarrow \begin{bmatrix} r_1 \\ r_2 \end{bmatrix} = \begin{bmatrix} h_{11} & h_{12} \\ h_{21} & h_{22} \end{bmatrix} \cdot \begin{bmatrix} s_1 \\ s_2 \end{bmatrix} + \begin{bmatrix} w_1 \\ w_2 \end{bmatrix}$$

$$\Leftrightarrow y = H \cdot s + v$$

$E[s] = 0$, $\text{Cov}[s] = E[s \cdot s^H] = 1 \cdot I$  constellations are normalized $E[v \cdot s^H] = 0$  data uncorrelated with noise + interference $E[h_{ij} \cdot s_k^*] = 0$, $\forall ij, k$  data uncorrelated with channel Note:

It is obvious that, when there is a different number of Rx antennas, there will be a corresponding, different number of received baseband signals $r_i$, and a different number of channel elements $h_{ij}$. For example, in the case of 4 Rx antennas, there will be 4 Rx signals: $r_1$, $r_2$, $r_3$, $r_4$, and there will be 8 channel elements: $h_{11}$, $h_{12}$, $h_{21}$, $h_{22}$, $h_{31}$, $h_{32}$, $h_{41}$, $h_{42}$. Therefore, the appropriate signal model, with channel-matrix H of dimension 4×2, is:

Equation 5

Basebands Signal Model of 2×4 Spatial-Multiplexing *MIMO*

$$\begin{cases} r_1 = h_{11}s_1 + h_{12}s_2 + w_1 \\ r_2 = h_{21}s_1 + h_{22}s_2 + w_2 \\ r_3 = h_{31}s_1 + h_{32}s_2 + w_3 \\ r_4 = h_{41}s_1 + h_{42}s_2 + w_4 \end{cases}$$

$$\Leftrightarrow \begin{bmatrix} r_1 \\ r_2 \\ r_3 \\ r_4 \end{bmatrix} = \begin{bmatrix} h_{11} & h_{12} \\ h_{21} & h_{22} \\ h_{31} & h_{32} \\ h_{41} & h_{42} \end{bmatrix} \cdot \begin{bmatrix} s_1 \\ s_2 \end{bmatrix} + \begin{bmatrix} w_1 \\ w_2 \\ w_3 \\ w_4 \end{bmatrix}$$

$$\Leftrightarrow y = H \cdot s + v$$

$E[s] = 0$, $\text{Cov}[s] = E[s \cdot s^H] = 1 \cdot I$  constellations are normalized $E[v \cdot s^H] = 0$  data uncorrelated with noise + interference $E[h_{ij} \cdot s_k^*] = 0$, $\forall ij, k$  data uncorrelated with channel The nomenclature "2×4" denotes the dimensions of the 4×2 channel-matrix H.

It is important and beneficial to use the vector-notation y=H·s+v, since this enables considering various generalizations of the equations and subsequent decoding methods; i.e., the vector-notation enables treating any number of Tx and Rx antennas in a unified manner.

The New Decoding Methods

The innovative methods for decoding Spatial-Multiplexing MIMO called PMLMS™, are also applicable to Collaborative MIMO (which is a special case of Spatial-Multiplexing).

Benefits

1. For a Spatial-Multiplexing system that has 2 Tx antennas, the decoding performance is optimum (best performance), i.e., it achieves a solution that is equal to the Maximum-Likelihood (ML) solution. (It is understood that this performance is valid for a system with any number of Rx antennas.)

2. For a Spatial-Multiplexing system that has more than 2 Tx antennas (e.g., 3 to 8 Tx antennas), its decoding performance is less than the optimum Maximum-Likelihood (ML) performance, but much better than that of the Full-MN/ISE or Zero-Forcing (Decorrealtion) methods. As the number of Tx antennas increases above 2, the performance decreases compared to ML (and the performance advantage compared to Full-MMSE or Zero-Forcing decreases). However, practical systems use a relatively low number of Tx antennas, e.g., usually not more than 4 Tx antennas, and for these cases, the performance of the current invention is only slightly less than ML, but still better than the Full-MMSE or Zero-forcing methods. (It is understood that this performance is valid for a system with any number of Rx antennas.)
3. The computational complexity (number of calculations) is substantially less than that of the Maximum-Likelihood (ML) method. In general terms, for 2 Tx antennas the computational complexity grows linearly with the number of Tx antennas and linearly with the constellation size: O(nM), and for more than 2 Tx antennas the computational complexity grows with the cube of the number of Tx antennas and linearly with the constellation size: $O(n^3M)$, where n is the number of Tx antennas and M is the size of the constellation (the signaling alphabet): QPSK has M=4, 64-QAM has M=64, etc. Compare this to the computational complexity of ML, which is: $O(M^n)$.

Decoding Method #1

Figure 3:
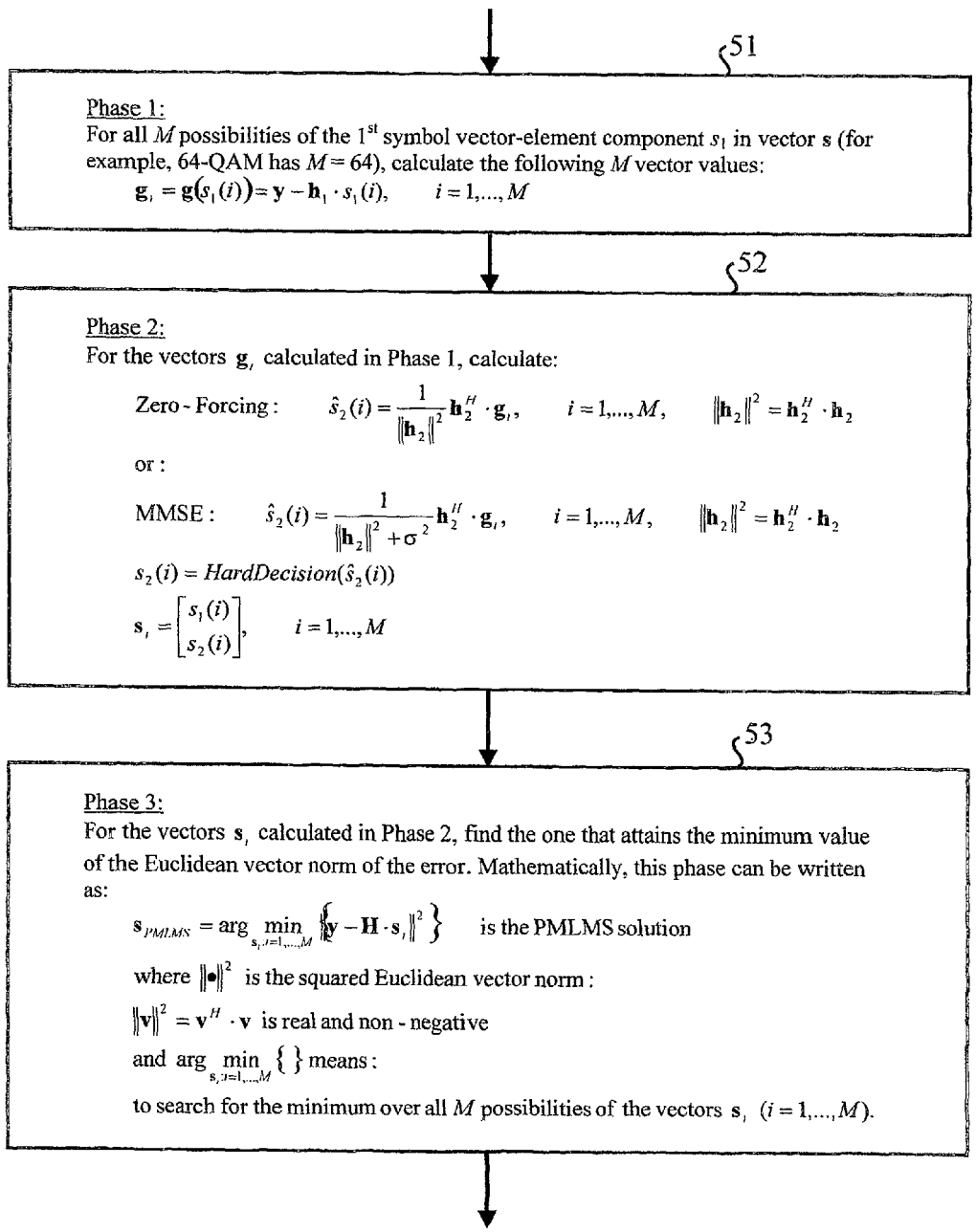
FIG. 3 details a decoding method suitable for a system with two transmit antennas.

This method is suitable for a system with 2 transmit (Tx) antennas, see FIG. 3.

The baseband signal model is written using vector-notation as: y=H·s+v, as shown in Equation 4 and Equation 5. It is understood that the mathematical notation is the same for a system with any number of Rx antennas.

In the case of a system with 2 Tx antennas, the equation can be written with separated channel-matrix columns as:

Development of Baseband Signal Equation      Equation 6

$$y = H \cdot s + v$$
$$= [h_1 \ h_2] \cdot s + v$$
$$= h_1 s_1 + h_2 s_2 + v$$

where $h_1$ denotes the 1st column in $H$, and $h_2$ denotes the 2nd column.

For example, when there are 4 $Rx$ antennas:

$$h_1 = \begin{bmatrix} h_{11} \\ h_{21} \\ h_{31} \\ h_{41} \end{bmatrix}, \quad h_2 = \begin{bmatrix} h_{12} \\ h_{22} \\ h_{32} \\ h_{42} \end{bmatrix}$$

1. Phase 1:

For all M possibilities of the $1^{st}$ symbol vector-element component $S_i$ in vector s (for example, 64-QAM has M=64), calculate the following M vector values [51]:

$$g_i = g(s_1(i)) = y - h_1 \cdot s_1(i), i=1,\ldots,M$$

Equation 7: Phase 1 of PMLMS for 2 Tx Antennas

2. Phase 2:

For the vectors $g_i$ calculated in Phase 1, calculate [52]:

Phase 2 of $PMLMS$ for 2 $Tx$ Antennas      Equation 8

$$\text{Zero-Forcing: } \hat{s}_2(i) = \frac{1}{\|h_2\|^2} h_2^H \cdot g_i,$$

-continued $$i = 1, \ldots, M, \quad \|h_2\|^2 = h_2^H \cdot h_2$$

or:

$$MMSE: \hat{s}_2(i) = \frac{1}{\|h_2\|^2 + \sigma^2} h_2^H \cdot g_i,$$

$$i = 1, \ldots, M, \quad \|h_2\|^2 = h_2^H \cdot h_2$$

$$s_2(i) = HardDecision(\hat{s}_2(i))$$

$$s_i = \begin{bmatrix} s_1(i) \\ s_2(i) \end{bmatrix}, \quad i = 1, \ldots, M$$

In the equation above, either one of the terms $$\frac{1}{\|h_2\|^2} h_2^H \text{ or } \frac{1}{\|h_2\|^2 + \sigma^2} h_2^H$$

which multiply the vectors $g_i$ (in either the Zero-Forcing or MMSE method, respectively), is calculated only once, at the beginning of Phase 2.

In the MMSE method, $\sigma^2$ is the noise+interference variance (power), with any compensation factor.

In the equation above, s=HardDecision(ŝ) means: Given an input point ŝ, which is any point with contiguous values, find the closest point s that belongs to the constellation (the signaling alphabet). (The constellation has a discrete set of finite number of values, for example: QPSK, 16-QAK 64-QA_M, etc.) This operation is well-known in the communications literature.

3. Phase 3:

For the vectors $s_i$ calculated in Phase 2, find the one that attains the minimum value of the Euclidean vector norm of the error. Mathematically, this phase can be written as [53]:

Phase 3 of $PMLMS$ for 2 $Tx$ Antennas      Equation 9

$$s_{PMLMS} = \arg \min_{s_i: i=1,\ldots,M} \{\|y - H \cdot s_i\|^2\}$$

is the $PMLMS$ solution where $\|\bullet\|^2$ is the squared Euclidean vector norm:
$\|v\|^2 = v^H \cdot v$ is real and non-negative and $\arg \min_{s_i: i=1,\ldots,M} \{\}$ means:

to search for the minimum over all $M$ possibilities of the vectors $s_i (i = 1, \ldots, M)$.

End of Method

Note that in order to prepare the decoded symbols for subsequent FEC decoding (FEC=forward-error correction code, either Convolutional, or Turbo-Code, or LDPC), it is usually necessary to create LLR (log-likelihood ratio) values, or other soft-decision metrics, which indicate the confidence level for each bit in the decoded symbols. This operation is well-known in the communications literature.

This operation is a subsequent and separate processing step.

Decoding Method #2

This method is suitable for a system with more than 2 transmit (Tx) antennas, see FIG. 4.

The baseband signal model is written using vector-notation as: y=H·s+v, similarly to Equation 4 and Equation 5, however now the dimension of vector s and the width of channel-matrix H are n, where n is the number of Tx antennas in the system, and n>2. It is understood that the mathematical notation is the same for a system with any number of Rx antennas. The following equations shall illustrate the case where the number in of Rx antennas is equal to or greater than the number n of Tx antennas: in n.

For simplicity of exposition, but without loss of generality, in the rest of this section we shall assume that the number of Tx antennas is n=4. It is understood that the processing thus described is valid for any number of Tx antennas.

In the case of 4 Tx antennas, the equation can be written with separated channel-matrix columns as:

Development of Baseband Signal Equation    Equation 10:

$$y = H \cdot s + v$$
$$= [h_1 \ h_2 \ h_3 \ h_4] \cdot s + v$$
$$= h_1 s_1 + h_2 s_2 + h_3 s_3 + h_4 s_4 + v$$

where $h_1$ denotes the 1st column in $H$, $h_2$ denotes the 2nd column, ect.

For example $$h_1 = \begin{bmatrix} h_{11} \\ h_{21} \\ h_{31} \\ h_{41} \end{bmatrix}, h_2 = \begin{bmatrix} h_{12} \\ h_{22} \\ h_{32} \\ h_{42} \end{bmatrix}, h_3 = \begin{bmatrix} h_{13} \\ h_{23} \\ h_{33} \\ h_{43} \end{bmatrix}, h_4 = \begin{bmatrix} h_{14} \\ h_{24} \\ h_{34} \\ h_{44} \end{bmatrix}$$

Additionally, the following definition will be necessary: $H_j$ shall be the channel-matrix H without column number j:

$$H_j = [h_1 \ldots h_{j-1} h_{j+1} \ldots h_4]$$

Examples:

$H_1 = [h_2 h_3 h_4]$, without $h_1$ $H_2 = [h_1 h_3 h_4]$, without $h_2$ $H_3 = [h_1 h_2 h_4]$, without $h_3$ $H_4 = [h_1 h_2 h_3]$, without $h_4$ Equation 11: Definition of Hj
1. Phase 0:

It is necessary to decide which of the symbols $s_1$, $s_2$, $s_3$, $s_4$ shall be the "main symbol", whose index shall be denoted by k or $j_{main}$. This decision is performed according to one of the following criteria [56]:

Criterion Alternative 1:

Phase 0, Criterion Alternative 1    Equation 12

$$k = j_{main} = \arg\min_{aj=1, 4rg} \{\det(H_j^H \cdot H_j)\}$$

where det( ) is the matrix determinant

Criterion Alternative 2:

Phase 0, Criterion Alternative 2    Equation 13

$$k = j_{main} = \arg\min_{j=1,\ldots,4} \{\|h_j\|^2\}, \|h_j\|^2 = h_j^H \cdot h_j$$

2. Phase 1:

For all M possibilities of the "main symbol" vector-element component $s_k$ in vector s (for example, 64-QAM has M=64), calculate the following M vector values [57]:

$$g_i = g(s_k(i)) = y - h_k \cdot s_k(i), i=1,\ldots,M$$

Equation 14: Phase 1 of PMLMS for n>2 Tx Antennas
3. Phase 2:

For the vectors $g_i$ calculated in Phase 1, calculate [58]:

Zero-Forcing: $\hat{s}_{without\ k}(i) = (H_k^H \cdot H_k)^{-1} \cdot H_k^H \cdot g_i$,
$i=1,\ldots,M$ or:

MMSE: $\hat{s}_{without\ k}(i) = (H_k^H \cdot H_k + \sigma^2 I)^{-1} \cdot H_k^H \cdot g_i$,
$i=1,\ldots,M$ $s_{without\ k}(i) = \text{HardDecision}(\hat{s}_{without\ k}(i))$ $s_i$ is a vector created from the main symbol $s_k(i)$, and the symbol vector—element components within the vector $s_{without\ k}(i)$, such that each symbol vector—element component will occupy its correct position within the vector $s_i$.

There are M vectors $s_i$ (i=1, ..., M)

Equation 15: Phase 2 of PMLMS for n>2 Tx Antennas)

In the equation above, either one of the terms $(H_k^H \cdot H_k)^{-1} \cdot H_k^H$ or $(H_k^H \cdot H_k + \sigma^2 I)^{-1} \cdot H_k^H$ which multiply the vectors $g_i$ (in either the Zero-Forcing or MMSE method, respectively), is calculated only once, at the beginning of Phase 2. Moreover, it is understood that there are various implementation alternatives in both Zero-Forcing and MMSE, as shown in Equation 1 and Equation 2, respectively.

In the MMSE method, $\sigma^2$ is the noise+interference variance (power), with any compensation factor.

In the equations above, s=HardDecision(ŝ) means: Given an input vector-point ŝ, which is any vector-point with contiguous values, find the closest vector-point s whose vector-element components belong to the constellations (the signaling alphabets) of each of the vector-element components. (The constellation of each of the vector-element components has a discrete set of finite number of values, for example: QPSK, 16-QAM, 64-QAM, etc.) This operation is well-known in the communications literature.

4. Phase 3:

This phase (Phase 3 in the case of more than 2 Tx antennas) is identical to Phase 3 in the case of 2 Tx antennas. It will be repeated here for convenience [59]:

For the vectors $s_i$ calculated in Phase 2, find the one that attains the minimum value of the Euclidean vector norm of the error. Mathematically, this phase can be written as:

Phase 3 of PMLMS for n > 2 Tx Antennas    Equation 16

$$s_{PMLMS} = \arg\min_{s_i: i=1,\ldots,M} \{\|y - H \cdot s_i\|^2\}$$

is the PMLMS solution where $\|\bullet\|^2$ is the squared Euclidean vector norm:

$\|v\|^2 = v^H \cdot v$ is real and non-negative and $\arg\min_{s_i: i=1,\ldots,M} \{\}$ means:

to search for the minimum over all M possibilities of the vectors $s_i (i = 1, \ldots, M)$.

Note that in order to prepare the decoded symbols for subsequent FEC decoding (FEC=forward-error correction code, either Convolutional, or Turbo-Code, or LDPC), it is usually necessary to create LLR (log-likelihood ratio) values, or other soft-decision metrics, which indicate the confidence level for each bit in the decoded symbols. This operation is well-known in the communications literature. This operation is a subsequent and separate processing step.

End of Method

General

This is the $2^{nd}$ part in the description of an innovative method for decoding Spatial-Multiplexing MIMO, called PMLMS™.

This is a direct extension of the $1^{st}$ part, which is described in the original disclosure to which this part forms an addition.

A novel decoding method is also applicable to Collaborative MIMO, also known as Multi-User MIMO or Multiple-Access MIMO (which is a special case of Spatial-Multiplexing).

This $2^{nd}$ part extends the original $1^{st}$ part with regard to 2 issues:

1. Describes methods and means of preparing MIMO decoded symbols for subsequent FEC decoding (FEC=forward-error correction code, e.g., Convolutional, Turbo-Code, LDPC, etc.). For this step, it is necessary to create LLR (log-likelihood ratio) values, or other Soft-Decision metrics, which indicate the confidence level for each bit in the decoded symbols.

2. Describes methods and means of reducing as much as possible the computational complexity (number of calculations). Specifically, with regard to a system having more than 2 Tx antennas, it is shown how to limit the computational complexity to $O(n^2 \cdot mM) = O(n^3 M)$, where n is the number of Tx antennas, and is proportional to m, the number of Rx antennas: $m = \alpha \cdot n$ (e.g., m=5 Rx antennas, n=4 Tx antennas, $\alpha=1.25$), and M is the size of the largest constellation (the largest signaling alphabet) (e.g., QPSK has M=4, 64-QAM has M=64, etc.).

Note: The MIMO decoding invention (PMLMS) described in the $1^{st}$ part, reduces the computational complexity, with regard to more than 2 Tx antennas, from $O(M^n)$ for the Maximum-Likelihood (ML) method, to $O(n^4 M)$ or $O(n^3 M)$ using the PMLMS invention, when the outputs are Hard-Decisions. This $2^{nd}$ part of the invention shows how to ensure that the limit of $O(n^3 M)$ is never exceeded when the outputs are either Hard-Decisions or Soft-Decisions (LLRs).

For the definitions of the terms MIMO, Tx, Rx, STC, Spatial-Multiplexing, Collaborative MEMO, FEC, LLR, etc., see section "Definitions and Notation" in this document.

REFERENCES

[5] "IEEE Standard for Local and Metropolitan Area Networks—Part 16: Fixed and Mobile," IEEE Standard 802.16e (Mobile) Corrigendal D12, 14 Oct. 2005.

[6] G. J. Foschini, "Layered Space-Time Architecture for Wireless Communication in a Fading Environment When Using Multi-Element Antennas," *Bell Labs Technical Journal*, vol. 2, pp. 41-59, 1996.

[7] Z. Guo and P. Nilsson, "Algorithm and Implementation of the K-Best Sphere Decoding for MIMO Detection," *IEEE Journal on Selected Areas in Communications*, Vol. 24, No. 3, March 2006.

[8] D. Tse and P. Viswanath, "Fundamentals of Wireless Communications," Cambridge University Press (ISBN 0-521-84527-0), 2005.

[9] B. M. Hochwald and S. ten Brink, "Achieving near-capacity on a multiple-antenna channel," *IEEE Trans. Comm.*, vol. 51, no. 3, pp. 389-399, March 2003.

[10] S. Baro, J. Hagenauer, and M. Witzke, "Iterative detection of MIMO transmission using a list-sequential (liss) detector," in *Proc. IEEE Int. Conf. Comm.* 2003, pp. 2653-2657, 2003.

[11] E. Biglieri, A. Nordio, and G. Taricco, "Iterative receivers for coded MIMO signaling," Wireless Comm. and Mobile Comp., no. 4, pp. 697-710, 2004.

[12] B. Hassibi, "An efficient square-root algorithm for BLAST," submitted to IEEE Trans. Sig. Proc., 1999.

[13] G. H. Golub and C. Van Loan, "Matrix Computations, $3^{rd}$ Edition," Johns Hopkins University Press, 1996.

[14] The MathWorks, *MATLAB*, version 6.5, release 13, 2002.

[15] Z. Hong and B. L. Hughes, "Robust space-time codes for broadband OFDM systems," in *Proc. IEEE WCNC '02*, vol. 4, pp. 105-108, March 2002.

[16] I. Lee, A. M. Chan, and C. E. W. Sundberg, "Space-time bit interleaved coded modulation for OFDM systems in wireless LAN applications," in *Proc. IEEE ICC '03*, vol. 5, pp. 3413-3417, 2003.

[17] P. W. Wolniansky, G. J. Foschini, G. D. Golden, R. A. Valenzuela, "V-BLAST: An architecture for realizing very high data rates over the rich-scattering wireless channel," Proc. IEEE ISSSE-98, September 1998

DEFINITIONS AND NOTATION

Definitions and Acronyms

Tx: Transmit or transmitter(s).

Rx: Receive or receiver(s).

MIMO: Multiple-input, multiple-output. Communication systems which use several (more than one) Tx antennas, and several (more than one) Rx antennas. The purpose of using MIMO compared to a single antenna for Tx and Rx, is to improve the signal decoding and detection at the receiver (due to the statistics of signal propagation in the physical space), or to increase the transmission data-rate (without increasing the used bandwidth or modulation), or both (improved decoding together with increased data-rate).

STC: Space-Time Coding. Generally, these are various schemes that take advantage of the physical separation between Tx antennas and between Rx antennas, and the statistics of signal propagation in the physical space, to increase the noise-immunity of the transmitted signals.

Spatial Multiplexing/Layered STC/Space-Division Multiple-Access (SDMA): Forms of space-time coding where redundant information is usually not transmitted, and the increase in the noise-immunity of the transmitted signals is due only to the statistics of the highly scattering signal propagation in the physical space, such as in the well-known V-BLAST scheme (see [17]). This is an Open-Loop method. In contrast to the regular Spatial-Multiplexing encoding, also called V-BLAST (see [17]), in D-BLAST (see [2]) there is additional structure and usually redundancy in the encoding, which can improve decoding performance when accounted-for properly.

Collaborative MIMO/Multi-User MIMO/Multiple-Access MIMO: A specific application of Spatial Multiplexing, where the transmitting antennas belong to different and separate transmitting systems; each separate transmitting system may have only a single Tx antenna. Typically, there is a single common receiving system, which receives the transmissions and decodes them jointly.

This is a special case of Spatial Multiplexing. Since the channel attenuation from separate transmitting systems may be drastically different, then it may necessitate the signal constellation (the signaling alphabet) to be different from each of the transmitting sources (e.g., QPSK has M=4, 64-QAM has M=64, etc.). When the separate transmitting systems do not share encoded data between them, with regard to FEC encoding, only so-called Horizontal Encoding may be used—see definitions of FEC and Horizontal Encoding below.

Open-Loop: When the transmitter does not have knowledge of the channels between the Tx and Rx antennas. These methods are suitable for highly mobile scenarios.

Closed-Loop: When the transmitter has knowledge of the channels, either exactly, or in some statistical sense, then the transmitter can use some method of Precoding to create optimal transmission signals. The transmitter can obtain the channel state information either via feedback from the receiver or via reciprocity of the channels in TDD systems. These methods are only suitable in fixed or very low mobility scenarios.

Beamforming: Forms of signal processing, either in the transmitter (Tx-BF) or receiver (Rx-BF) or both (combined-Tx-and-Rx-BF) for creating a directivity gain in the spatial direction of the desired signal(s), and suppression or nulling in the spatial direction of interferers (and noise) and other non-desired signal sources.

MIMO Decoding methods: Methods for decoding the symbols and data sent using any form of MIMO. Existing types of decoding methods (prior art): Maximum-Likelihood (ML), Sphere-Decoding (an approximation to ML), Zero-Forcing (also called Decorrelation), Partial Correlation (Matched Filtering), Full or Partial MMSE (minimum mean-square error), MMSE with Interference Cancellation (IC either Successive (SIC) or Parallel (PIC)), Iterated MMSE with IC, Turbo-MIMO (jointly with FEC decoding).

OFDM: Orthogonal Frequency-Division Multiplexing. Communication method resembling multi-carrier modulation, where each subcarrier is placed as close as possible to its neighboring subcarriers, but is orthogonal to them (and therefore does not interfere with them). The processing for modulating and demodulating is usually performed using IFFT and FFT, respectively (Inverse and direct Fast Fourier Transform, respectively). The complete OFDM symbols are broadband, but each subcarrier observed separately is usually narrowband. This method is used in the communication standard TREE 802.11a/g.

OFDMA: Orthogonal Frequency-Division Multiple-Access. Communication method similar to OFDM (see above), where the reserved bandwidth is shared between different users; each user is allocated only part (not necessarily all) of the available subcarriers. Different users overlap in time, but not in frequency. It is similar to, and suitable for cellular-type of communications. The complete OFDMA symbols are broadband, but each subcarrier observed separately is usually narrowband. This method is used in the communication standard IEEE 802.16e, see [1].

CDMA: Code-Division Multiple-Access. Communication method based on Direct-Sequence Spread-Spectrum, which uses orthogonal or quasi-orthogonal spreading sequences to separate between different users that share the same reserved bandwidth. Different users overlap in both time as well as frequency, but may be separated using the spreading sequences, since the spreading increases each user's processing gain. It is suitable for cellular-type of communications. The complete CDMA transmission is broadband, but the symbols after de-spreading are narrowband. This method is used in the communication standard WCDMA part of UMTS (also called IMT-2000, an initiative for 3G).

FEC: Forward-Error Correction code. In digital communications, this is a method of introducing deliberate redundancy in the data-transmission, in a way that enables the correction of bit- and/or symbol-errors at the receiver(s). Well-known types of FEC are: Hamming, Reed-Solomon, Convolutional, Turbo-Code, LDPC, etc. See also the definition of LLR below.

LLR (Log-Likelihood Ratio)/Soft-Decision metric: In a decoder for a FEC (forward-error correction) code at the receiver, there usually is a considerable performance advantage to operate on soft-decision input metrics, as opposed to hard-decisions. A Hard-Decision means that each code symbol component is pre-quantized prior to decoding, to one of a discrete set of values from the original signaling alphabet. In contrast to this, a Soft-Decision metric is a method of indicating the confidence level for each bit in the decoded symbols. A theoretically rigorous method for soft-decisions is an LLR (log-likelihood ratio).

Vertical Encoding: A case or application when the FEC encoding is common over all the transmitted symbols from all Tx antennas in a MIMO system. This provides increased diversity, and hence may provide increased noise-immunity compared to Horizontal Encoding—see below. This case may be considered as a special case or application of Bit-Interleaved Coded Modulation (BICM) applied to MIMO, see [15], [16].

Horizontal Encoding: A case or application when the FEC encoding is separate for each stream of transmitted symbols from each Tx antenna separately. In applications of Collaborative MIMO (also known as Multi-User MIMO or Multiple-Access MIMO), in which the separate transmitting systems do not share encoded data between them, with regard to FEC encoding, only Horizontal Encoding may be used; this is because the lack of data sharing prevents one transmitting system from encoding its own data within the same FEC encoding as that of another transmitting system.

Mathematical Notation

All Greek-letter symbols indicate real (non-complex) scalar numbers (e.g.: $\alpha, \beta, \gamma$).

The English-letter symbols: i, j, k, m, n indicate integers, usually used as index variables.

All other English-letter symbols indicate complex scalars, vectors, or matrices: lower-case non-bold symbols are scalars (e.g.: h,g), lower-case bold symbols are column vectors (e.g.: h,g), upper-case symbols are matrices (e.g.: H, G or H, G).

The notation $(\bullet)^*$ is the complex conjugate (for scalars, vectors, or matrices).

In the notation $(\bullet)^H \equiv (\bullet)^{*T}$, T is the transpose (without complex conjugation), and H is the Hermitian-transpose (complex conjugate transpose).

Signal Model for Spatial-Multiplexing MIMO

In cases where/when it is possible to estimate the statistics of the noise+interference, then these estimations are used in a preliminary pre-processing step in order to maintain the assumptions of the signal model given below. The methods and means of performing these estimations and pre-processing are beyond the scope of this invention description. Some of them are well-known in the communications literature.

A specific well-known application of Spatial Multiplexing (a special case), is Collaborative MIMO, also known as Multi-User MIMO or Multiple-Access MIMO. In this application, the transmitting antennas belong to different and separate transmitting systems. Typically, there is a single common receiving system, which receives the transmissions and decodes them jointly. See F. Since this is a special case of Spatial Multiplexing, the signal model and subsequent decoding methods can be applied to this application as well.

Equations of the Baseband Signal Model:

The additive noise+interference is assumed to obey the following statistics:

$E[v] = 0$ zero-mean $Cov[v] = E[v \cdot v^H] = \sigma^2 \cdot I$ equal-variance, uncorrelated components $v$ is symmetrically complex.

Equation 46: Assumed Noise+Interference Statistics
where $\sigma^2$ is the noise+interference variance (power), with any compensation factor.

In cases where/when it is possible to estimate the statistics of the noise+interference, then these estimations are used in a preliminary pre-processing step in order to maintain the assumptions of the signal model given here. The methods and means of performing these estimations and pre-processing are beyond the scope of this invention description. Some of them are well-known in the communications literature.

The additive noise+interference is assumed to obey the following statistics:

$E[v] = 0$ zero-mean $Cov[v] = E[v \cdot v^H] = \sigma^2 \cdot I$ equal-variance, uncorrelated components $v$ is symmetrically complex.

Equation 47: Assumed Noise+Interference Statistics
where $\sigma^2$ is the noise+interference variance (power), with any compensation factor.

In cases where/when it is possible to estimate the statistics of the noise+interference, then these estimations are used in a preliminary pre-processing step in order to maintain the assumptions of the signal model given here. The methods and means of performing these estimations and pre-processing are beyond the scope of this invention description. Some of them are well-known in the communications literature.

Note:

It is important and beneficial to note that using the vector-notation $y = H \cdot s + v$ enables considering different generalizations of the equations and subsequent decoding methods; i.e., the vector-notation enables treating any number of Tx and Rx antennas in a unified manner.

Existing Methods for Soft-Decision Output MIMO Decoders (Prior Art)

In general, there are various methods to obtain soft-decision output metrics from MIMO decoders. Usually, each MIMO decoding method has different techniques for generating the soft-decision output metrics, according to viability or simplicity of implementation suited to the particular MIMO decoding method.

In the following discussion, it is assumed that the transmitted symbols are $s_j$, $j=1, \ldots, n$ in the vector s of the baseband signal model similarly to the examples shown in Equation 4. The dimension (length) of vector s and the width of channel-matrix H are n, where n is the number of Tx antennas in the system, and $n \geq 2$. Furthermore, each symbol $s_j$ consists of a possibly different number of bits, according to its modulation. The combined group of bits from all symbols shall be denoted $[b_l]_{l=1, \ldots, n_B}$, with $n_B$ bits. For example, in a system with 2 Tx antennas, s1 (from the 1$^{st}$ Tx antenna) is modulated as QPSK (signaling alphabet size $M_1=4$) and s2 (from the 2$^{nd}$ Tx antenna) is modulated as 64-QAM (signaling alphabet size $M_2=64$), then s1 consists of the 2 bits $b_1$, $b_2$ and s2 consists of the 6 bits $b_3$, $b_4$, $b_5$, $b_6$, $b_7$, $b_8$; the combined group of bits is: $[b_l]_{l=1, \ldots, n_B} = [b_1, b_2, b_3, b_4, b_5, b_6, b_7, b_8]$, $n_B = 8$ bits.

Note that enumerating the bits starting with l=1 (i.e., l=1, ..., 8) instead of l=0 (i.e., l=0, ..., 7) as customary in computer arithmetic, is not significant in the present discussion.

Note: In a system with Horizontal Encoding (see definition in section "Definitions and Acronyms"), the bits within symbols transmitted from different Tx antennas shall be destined (as soft-decision output metrics) to different FEC decoders at the receiver.

Consider the following non-exhaustive list of existing methods for soft-decision output MIMO decoders (prior art):

Maximum-Likelihood (ML)

Maximum-Likelihood (ML) is the optimum (best performance) decoding method, but is generally impractical. This method searches all possibilities for all symbols s1, s2, .... In general terms, the computational complexity grows exponentially with the number of Tx antennas and polynomially with the constellation size: $O(M^n)$, where n is the number of Tx antennas and M is the size of the constellation (the signaling alphabet).

Obtaining soft-decision output metrics for ML: Since all symbols are searched, various soft-decision output metric alternatives exist; one of the best soft-decision output metrics is the LLR (Log-Likelihood Ratio), which is based on rigorous theoretical concepts. Since all symbols are searched, then for a specific bit $b_1$, all possibilities are examined for both $b_1=0$ and $b_1=1$, from which the optimum (best performance) LLR soft-decision output value can be obtained. In this case, both the Exact LLR (incorporating all values of the metrics), as well as the Max-Log approximation (using only the minimal value for $b_1=0$ and minimal value for $b_1=1$), can be calculated.

The Exact LLR is derived as the ratio of the a-posteriori probabilities of the values for bit $b_1$:

Exact LLR for Maximum-Likelihood     Equation 48

$$LikelihoodRation = \frac{Pr(b_l = 1 \mid y)}{Pr(b_l = 0 \mid y)} = \frac{Pr(y \mid b_l = 1) \cdot Pr(b_l = 1)}{Pr(y \mid b_l = 0) \cdot Pr(b_l = 0)},$$

where:

$Pr(b_l = 1 \mid y) = a$ − posteriori probability of $b_l = 1$ given received $y$ $Pr(b_l = 1) = 1 - Pr(b_l = 1)$ is the $a$ − priori probability of bit $b_l = 1$.

Since $\log(\cdot)$ is a monotonously increasing function, it preserves the ordering, while reducing only the dynamic-range:

$$LLR_l = \log(LikelihoodRatio) = \log\frac{Pr(y \mid b_l = 1)}{Pr(y \mid b_l = 0)} + \log\frac{Pr(b_l = 1)}{Pr(b_l = 0)} =$$

$$\log\frac{\sum_{s:b_l=1}\left(Pr(y \mid s(b_l = 1)) \cdot \prod_{m \neq l} Pr(b_m)\right)}{\sum_{s:b_l=0}\left(Pr(y \mid s(b_l = 0)) \cdot \prod_{m \neq l} Pr(b_m)\right)} + \log\frac{Pr(b_l = 1)}{Pr(b_l = 0)}$$

When $Pr(b_l = 1) = Pr(b_l = 0) = 0.5$, then:

$$LLR_l = \log\frac{\sum_{s:b_l=1} Pr(y \mid s(b_l = 1))}{\sum_{s:b_l=0} Pr(y \mid s(b_l = 0))} = \log\frac{\sum_{s:b_l=1} \exp\left(-\frac{1}{\sigma^2}\|y - H \cdot s(b_l = 1)\|^2\right)}{\sum_{s:b_l=0} \exp\left(-\frac{1}{\sigma^2}\|y - H \cdot s(b_l = 0)\|^2\right)}$$

$\|\bullet\|^2$ is the squared Euclidean vector norm

Note 1: In the development above, the probability distribution function (pdf) of a zero-mean symmetrically complex Gaussian-distributed random vector v with in equal-variance uncorrelated components (Cov[v]= $\sigma^2 I_m$) is:

$$Pr(v) = \frac{1}{(\pi\sigma^2)^m} \exp\left(-\frac{1}{\sigma^2}\|v\|^2\right), \quad v \in C^{m \times 1}, \quad \|v\|^2 = v^H \cdot v \geq 0$$

Also note that it is different than the distribution function for a real vector w:

$$Pr(w) = \frac{1}{(2\pi\sigma^2)^{n/2}} \exp\left(-\frac{1}{2\sigma^2}\|w\|^2\right), \quad w \in R^{m \times 1}, \quad \|w\|^2 = w^T \cdot w \geq 0$$

Note 2: The definition given above for $LLR_l$ results in a signed metric, which is positive for a logical "1" bit value, and negative for a logical "0" bit value. Obviously, if the FEC decoder requires the opposite polarity convention, it is trivial to accommodate for such a requirement simply by inverting the sign of the LLR soft-decision output metric values before inputting them to the FEC decoder.

A well-known and useful approximation to the Exact LLR is the Max-Log approximation:

The Max-Log approximation:

$$\log(\exp(a)+\exp(b)) = \max\{a,b\} + \log(1+\exp(-|a-b|)) \cong \max\{a,b\}$$

or in our case:

$$\log\left(\sum_s \exp\left(-\frac{1}{\sigma^2}\|y - H \cdot s\|^2\right)\right) \cong \operatorname*{sum}_s\left(-\frac{1}{\sigma^2}\|y - H \cdot s\|^2\right)$$

Therefore:

Development of the Max-Log Approximation for the LLR     Equation 49

$$LLR_l = \log \frac{\sum_{s:b_l=1} \exp\left(-\frac{1}{\sigma^2}\|y - H \cdot s(b_l = 1)\|^2\right)}{\sum_{s:b_l=0} \exp\left(-\frac{1}{\sigma^2}\|y - H \cdot s(b_l = 0)\|^2\right)}$$

$$\cong \max_{s:b_l=1}\left\{-\frac{1}{\sigma^2}\|y - H \cdot s(b_l = 1)\|^2\right\} - \max_{s:b_l=0}\left\{-\frac{1}{\sigma^2}\|y - H \cdot s(b_l = 0)\|^2\right\}$$

$$= -\min_{s:b_l=1}\left\{\frac{1}{\sigma^2}\|y - H \cdot s(b_l = 1)\|^2\right\} + \min_{s:b_l=0}\left\{\frac{1}{\sigma^2}\|y - H \cdot s(b_l = 0)\|^2\right\}$$

$\sigma^2$ can be neglected, because the same for all bits.

To summarize, the Max-Log approximation to the LLR for Maximum-Likelihood is:

Equation 50

Max-Log Approximation LLR for Maximum-Likelihood $\gamma_l(0) = \min_{s:b_l=0}\{\|y - H \cdot s(b_l = 0)\|^2\}$ the minimum with s such that $b_l = 0$ $\gamma_l(1) = \min_{s:b_l=1}\{\|y - H \cdot s(b_l = 1)\|^2\}$ the minimum with s such that $b_l = 1$ $\|\bullet\|^2$ is the squared Euclidean vector norm H is the $m \times n$ channel-matrix, and y is the recieved $m \times 1$ signal vector $LLR_l \cong \frac{1}{\sigma^2}(\gamma_l(0) - \gamma_l(1))$, is the Max-Log LLR for bit $l$ $\sigma^2$ can be neglected, because the same for all bits.

Sphere-Decoding

Sphere-Decoding is a class of decoding which approximates Maximum-Likelihood (ML) by searching only a subset of the possible parameter-space, usually a sphere or paraboloid in an n-dimensional complex subspace over real and imaginary integers, or equivalently, a 2n-dimensional subspace over integers, where n is the number of Tx antennas. There are various ways to determine the reduced search parameter-space subset, in order to reduce the search size and computations as much as possible, while still achieving a solution that is equal to the Maximum-Likelihood (ML) solution.

Obtaining soft-decision output metrics for Sphere-Decoding: In general, there are 2 general classes of possibilities: (1) keeping a variable-length list of candidate solutions, from which the LLR soft-decision output metrics may be found; and (2) constraining the search-space to a fixed size. Class (1) is exemplified by the List Sphere-Decoder of [9] and the List-Sequential Sphere Decoder of [10]. The disadvantages of class (1) are variable decoding duration, the necessity for large buffers, and an architecture which is not well-suited for implementation in hardware. Class (2) is exemplified by the Modified ISE (MDSE) decoder of [3], which has a fixed decoding duration, and is well-suited for implementation in hardware. The disadvantage of class (2) is a possible loss in performance compared to the optimum Maximum-Likelihood (ML), because the fixed size of the search-space may not include the minimal metric either for bit $b_l=0$, or for bit $b_l=1$, or for both. See [3] and the references therein for an extensive review and description of the current state-of-the-art of Sphere Decoding.

Zero-Forcing (Decorrelation)

Zero-Forcing, also called Decorrelation, is basically a Least-Squares pseudo-inversion when the channel-matrix is rectangular, or a direct matrix inversion when the channel-matrix is square. Generally, this method provides very poor performance due to noise-amplification because some of the channel matrix elements, which are "poor", can cause deterioration of the whole decoding. However, the benefit of this method is its relatively low computational complexity (small number of calculations).

Obtaining soft-decision output metrics for ZF: Since the Zero-Forcing decoder is a linear operation on the received signal vector, the decoded symbols following this linear operation will be inherently "soft" in the sense that they usually do not exactly match any of the signal constellation values, prior to making a hard-decision.

Following are possibilities for Soft-Decision output metrics when using Zero-Forcing decoding:

Approximation to LLR for Zero-Forcing

Equation 51

$H$ is the $m \times n$ channel-matrix, with $m \geq n$ (more $Rx$ antennas than $Tx$ antennas, or equal), and $y$ is the received $m \times 1$ signal vector $\hat{s}_{ZF} = (H^H \cdot H)^{-1} \cdot H^H \cdot y$ is the "soft" Zero-Forcing solution $s_{ZF} = \text{HardDecision}(\hat{s}_{ZF})$ $s_{ZF}(b_l = 0)$ is closest symbol to $s_{ZF}$, such that $b_l = 0$ $s_{ZF}(b_l = 1)$ is closest symbol to $s_{ZF}$, such that $b_l = 1$ Note: either $s_{ZF}(b_l = 0) = s_{ZF}$ or $s_{ZF}(b_l = 1) = s_{ZF}$.

Possibility 1:

$\zeta_l(0) = \|\hat{s}_{ZF} - s_{ZF}(b_l = 0)\|^2$, $\|\bullet\|^2$ is the squared vector norm $\zeta_l(1) = \|\hat{s}_{ZF} - s_{ZF}(b_l = 1)\|^2$, $\|\bullet\|^2$ is the squared vector norm $C_{ZF} = \text{Cov}[\hat{s}_{ZF}] = \sigma^2 (H^H \cdot H)^{-1}$, $\sigma^2$ can be neglected (same for all bits)

$\omega_j = \frac{1}{[C_{ZF}]_{j,j}}$, $[\bullet]_{j,j}$ is $j$th diagonal element of the matrix, and $j$ is symbol index of the symbol $s_j$ which includes bit $b_l$.

$LLR_l \approx \omega_j(\zeta_l(0) - \zeta_l(1))$, is the approximation to LLR for bit $l$ Possibility 2:

$\zeta_l(0) = \|H \cdot (\hat{s}_{ZF} - s_{ZF}(b_l = 0))\|^2$, $\|\bullet\|^2$ is the squared vector norm $\zeta_l(1) = \|H \cdot (\hat{s}_{ZF} - s_{ZF}(b_l = 1))\|^2$, $\|\bullet\|^2$ is the squared vector norm $LLR_l \approx \frac{1}{\sigma^2}(\zeta_l(0) - \zeta_l(1))$, is the approximation to LLR for bit $l$ $\sigma^2$ can be neglected in the last equation, because the same for all bits.

Full or Partial MMSE

MMSE (minimum mean-square error) takes into consideration the noise (and possibly self-interference), in order to reduce or eliminate the noise-amplification found in Zero-Forcing, however, the performance is less than the optimum Maximum-Likelihood (ML) method. There are 2 methods for doing this: (1) Perform MMSE over the full channel matrix; (2) Perform partial MMSE, by treating some of the matrix columns as self-interference, and take them into account in the decoding process. Generally, the MMSE methods have a small performance advantage over Zero-Forcing. A similar but better method is MMSE with Interference Cancellation (the idea of Successive Interference Cancellation with regard to MEM decoding is described in [2] for D-BLAST and [17] for V-BLAST). It is observed that the successive decoding order originally described for V-BLAST in [17] is "strongest first" at each stage (see also [12]), whereas the decoding order described in the 1$^{st}$ part of this PMLMS invention with regard to Hard-Decision outputs is "weakest first".

Obtaining soft-decision output metrics for Full MMSE: Since the Full MMSE decoder is a linear operation on the received signal vector, the decoded symbols following this linear operation will be inherently "soft" in the sense that they usually do not exactly match any of the signal constellation values, prior to making a hard-decision.

Following are possibilities for Soft-Decision output metrics when using Full MMSE decoding:

Approximation to LLR for Full-MMSE

Equation 52

$H$ is the $m \times n$ channel-matrix, with $m \geq n$ (more $Rx$ antennas than $Tx$ antennas, or equal), $y$ is the received $m \times 1$ signal vector, and $\sigma^2$ is the noise + interference variance(power)

(with any compensation factor)

$\hat{s}_{MMSE} = (H^H \cdot H + \sigma^2 I_n)^{-1} \cdot H^H \cdot y$ is the "soft" full-MMSE solution $s_{MMSE} = \text{HardDecision}(\hat{s}_{MMSE})$ $s_{MMSE}(b_l = 0)$ is closest symbol to $s_{MMSE}$, such that $b_l = 0$ $s_{MMSE}(b_l = 1)$ is closest symbol to $s_{MMSE}$, such that $b_l = 1$ Note: either $s_{MMSE}(b_l = 0) = s_{MMSE}$ or $s_{MMSE}(b_l = 1) = s_{MMSE}$.

Possibility 1:

$\mu_l(0) = \|\hat{s}_{MMSE} - s_{MMSE}(b_l = 0)\|^2$, $\|\bullet\|^2$ is the squared vector norm $\mu_l(1) = \|\hat{s}_{MMSE} - s_{MMSE}(b_l = 1)\|^2$, $\|\bullet\|^2$ is the squared vector norm $C_{MMSE} = \sigma^2 (H^H \cdot H + \sigma^2 I_n)^{-1}$ $\omega_j = \frac{1}{[C_{MMSE}]_{j,j}}$, $[\bullet]_{j,j}$ is $j$th diagonal element of the matrix, and $j$ is the symbol index of the symbol $s_j$ which includes bit $b_l$.

$LLR_l \approx \omega_j(\mu_l(0) - \mu_l(1))$, is the approximation to LLR for bit $l$ Possibility 2:

$\mu_l(0) = \left\| \begin{bmatrix} H \\ \sigma I_n \end{bmatrix} \cdot (\hat{s}_{MMSE} - s_{MMSE}(b_l = 0)) \right\|^2$, $\|\bullet\|^2$ is the squared vector norm $\mu_l(1) = \left\| \begin{bmatrix} H \\ \sigma I_n \end{bmatrix} \cdot (\hat{s}_{MMSE} - s_{MMSE}(b_l = 1)) \right\|^2$, $\|\bullet\|^2$ is the squared vector norm $H$ is the $m \times n$ channel-matrix, and $\sigma^2$ is the noise + interference variance(power)

(with any compensation factor)

$LLR_l \approx \frac{1}{\sigma^2}(\mu_l(0) - \mu_l(1))$, is the approximation to LLR for bit $l$ $\sigma^2$ can be neglected in the last equation, because the same for all bits.

Obtaining soft-decision output metrics for MMSE with Interference Cancellation: At each stage of the decoding process, following the cancellation of previous symbols based on a hard-decision, the decoding consists of MMSE decoding incorporating nulling. Therefore, at each stage, the approximate LLR for bit/is a similar expression as the one for full-MMSE above, but where the channel-matrix is one with the appropriate nulling structure and reduced number of columns (due to previously cancelled symbols).

Obtaining soft-decision output metrics for Iteratively Decoded D-BLAST systems: See Turbo-MIMO below.

Turbo-MIMO (Iterative Decoding)

Turbo-MIMO, also called Iterative Decoding, is an iterated version of MMSE with Interference Cancellation, where MIMO decoding is performed jointly with FEC decoding (FEC=forward-error correction code, either Convolutional, or Turbo-Code, or LDPC).

The advantage of an iterative receiver (employing the so-called turbo decoding principle) with regard to MIMO decoding, is that it reaches the Maximum-Likelihood solution, and can even consistently reach the capacity of the MIMO channel over fast-fading. The disadvantages are increased system complexity and non-modular system structure, both of which are caused by too tight integration with the FEC decoder, as well as increased hardware memory resources. An inherent requirement of an iterative receiver (employing the so-called turbo decoding principle) with regard to MIMO decoding, is that the MIMO decoder must have soft-decision output metrics and be able to take advantage of a-priori information for decoding bits, as well as the FEC decoder, which must have soft-decision output metrics and (obviously) be able to accept soft-inputs. One of the first adaptations of an iterative receiver (employing the so-called turbo decoding principle) to MEMO is [9]. See also [11] which presents a survey. In order to implement such an iterative receiver, it is possible to employ any type of MIMO decoder which has soft-decision output metrics (but due to the turbo decoding principle, it does not necessarily need to reach the Maximum-Likelihood (ML) solution); popular choices are various forms of Sphere-Decoders (which do not necessarily reach the ML solution), especially those with a fixed decoding duration—see above.

Obtaining soft-decision output metrics for Iteratively Decoded D-BLAST systems: In contrast to the regular Spatial-Multiplexing encoding, also called V-BLAST (see [17]), in D-BLAST (see [2]) there is additional structure and usually redundancy in the encoding, which can improve decoding performance when accounted-for properly. Decoding systems for D-BLAST sometimes employ non-optimum decoders for intermediate results, however, the structure (and optional redundancy), together with the application of iterative decoding by combining the FEC decoding results, can provide excellent overall performance after relatively few iterations; see [11]; note the disadvantages of iterative receivers mentioned above.

It is well-known from matrix analysis literature (see [13], [14]) that better numerical accuracy, stability, and sometimes lower computation complexity may be obtained by using various matrix-decomposition methods. The application of these techniques to the Zero-Forcing and MMSE methods has been presented in the $1^{st}$ part of the PMLMS invention description (see separate doc).

In the equations above for the soft-decision output metrics of Zero-Forcing and MMSE, s=HardDecision(ŝ) means: Given an input vector-point ŝ, which is any vector-point with contiguous values, find the closest vector-point s whose vector-element components belong to the constellations (the signaling alphabets) of each of the vector-element components. (The constellation of each of the vector-element components has a discrete set of finite number of values, for example: QPSK, 16-QAM, 64-QAM, etc.) This operation is well-known in the communications literature.

Existing Methods for Computational Complexity Reduction (Prior Art)

It is well-known from matrix analysis literature (see [13], [14]) that better numerical accuracy, stability, and sometimes lower computation complexity may be obtained by using various matrix-decomposition methods. For example: QR decomposition, SVD (singular-value decomposition), and Cholesky factorization. The application of these techniques to the Zero-Forcing and MMSE methods has been presented in the $1^{st}$ part of the PMLMS invention description (see separate doc).

The computational complexity (number of calculations) of QR or SVD decompositions of a complex-valued rectangular matrix A of dimensions m×n, m≥n, is approximately $O(n^2 m)$, see [13]. In cases when m and n are linearly related as m=α·n and of the same order-of-magnitude (e.g., m=5, n=4, α=1.25), then it is valid to say that the complexity is: $O(n^2 m) = O(n^3)$.

The complexity of a Cholesky factorization of a complex-valued square Hermitian positive-definite matrix B of dimensions n×n, is approximately $O(n^3)$, see [13].

Observe that the computational complexities of the QR, SVD, and Cholesky decompositions are of the same order-of-magnitude: $O(n^3)$.

In our case, in the role of matrix A, there is a complex channel-matrix H of dimensions m×n, m≥n, where n is the number of Tx antennas, and is proportional to m, the number of Rx antennas: m=α·n (e.g., m=5 Rx antennas, n=4 Tx antennas, α=1.25). In practical cases of interest, m and n are of the same order-of-magnitude, i.e., the proportionality factor α between m and n is not large. Defining $B = H^H \cdot H$, then B is a complex-valued square Hermitian non-negative-definite matrix of dimensions n×n.

In some cases, such as the one to be presented in this $2^{nd}$ part of the PMLMS invention description, it is necessary to obtain several decompositions of related matrices, which are related to the channel-matrix H, and differ one from the other (and from the original matrix H) by a single column.

Specifically, the following definition shall be necessary, and is equivalent to Equation 11 in the $1^{st}$ part; it is reproduced here for convenience.

Assume that the matrix H has dimensions 5×4 (m=5, n=4) for illustrational purposes, then a matrix Hj is defined as:

$H_j$ shall be the channel-matrix H without column number j:

$$H_j = [h_1 \ldots h_{j-1} h_{j+1} \ldots h_4]$$

Examples:

$$H_1 = [h_2 h_3 h_4], \text{without } h_1$$

$$H_2 = [h_1 h_3 h_4], \text{without } h_2$$

$$H_3 = [h_1 h_2 h_4], \text{without } h_3$$

$$H_4 = [h_1 h_2 h_3], \text{without } h_4$$

Equation 53: Definition of Hj

Therefore, all the matrices Hj shown above have dimensions 5×3.

Obviously, the specific dimensions shown here are only for illustrational purposes; the definition of the matrices $H_j$, j=1, ..., n each of dimensions m×(n−1), are applicable to any m×n matrix H.

It is well-known from matrix analysis literature (see [13], [14]) that if the QR or SVD decompositions of the original matrix H have already been computed, then it is possible to obtain the respective decompositions of a matrix Hj as updates of the existing decompositions of H, i.e., without the need to re-compute the complete decompositions. This update is achieved in the case of a QR decomposition of H, by performing up to $O(nm)=O(n^2)$ Givens rotations, to both of the existing R and Q matrices, to obtain Rj and Qj. The advantage of this strategy is a computational savings. Specifically, the complexity of the decomposition updates are only $O(nm)=O(n^2)$, compared to a re-compute of the complete decompositions, whose complexity is $O((n-1)^2 m)=O(n^2 m)=O(n^3)$. See [13]. A similar method exists for updating an existing SVD decomposition. This decomposition updating operation shall be denoted in this document by: $[Q_j, R_j]$=UpdateRemoveCohmmOR(Q,R,j) in the case of QR decomposition, and by: $[U_j, D_j, V_j]$=UpdateRemoveColumnSVD(U,D,V,j) in the case of SVD decomposition.

Therefore, when it is necessary to obtain the QR or SVD decompositions for all n matrices $H_j$, j=1, ..., n, then a simplistic separate re-computation for each Hj separately will result in a computational complexity: $n \cdot O((n-1)^2 m)=O(n \cdot n^2 m)=O(n^3 m)=O(n^4)$, whereas using n separate updates, one for each Hj separately will result in a computational complexity: $n \cdot O(nm)=O(n \cdot nm)=O(n^2 m)=O(n^3)$.

The dimensions of the various matrices in the decomposition of H, m×n when m≥n, in the case of a QR decomposition are: Q: m×n, R: n×n in the "economy-size" representation (R is upper-triangular), but can be Q: m×m, R: m×n in the "full-size" representation (R is upper-triangular in the sense: non-zero on and above the elements $[R]_{i,j}$), see [14]. The dimensions of the decomposition of Hj: m×(n−1) (whether performed directly or obtained using updates as described above) are: Qj: m×(n−1), (n−1)×(n−1) in the most "economy-size" representation ($R_j$ is upper-triangular), but can be Qj: m×m, Rj: m×(n−1) in the "full-size" representation ($R_j$ is upper-triangular in the sense: non-zero on and above the elements $[R_j]_{i,j}$). Similarly, in the case of SVD, there are also "economy-size" and "full-size" representations, see [14].

Defining $B=H^H \cdot H$ (dimension n×n), and $B_j = H_j^H$ (dimension (n−1)×(n−1)), then it is somewhat tricky to update an existing Cholesky factorization C of B (dimension n×n) to the factorization Cj of Bj (dimension (n−1)×(n−1)), assuming B and Bj are positive-definite. This type of Cholesky update will not be discussed.

An existing method for computational complexity reduction which was specifically tailored for decoding Spatial-Multiplexing MIMO (V-BLAST) with computational complexity $O(n^3)$ instead of $O(n^4)$ is described in [12]. However, it incorporates the "strongest first" successive decoding order at each stage, originally described for V-BLAST in [17]. This existing decoding method is known to be sub-optimal in terms of decoding performance. Whereas in the present invention, described in the $1^{st}$ part of the invention with regard to Hard-Decision outputs, the decoding order is "weakest first", as given by Equation 54 in this $2^{nd}$ part document, which is a reproduction of Equation 12 from the $1^{st}$ part document. See also the section "Description of the Invention for Computation Reduction when Outputs are Hard-Decisions" in this document.

Innovative Decoding Method

The innovative method for decoding Spatial-Multiplexing MIMO (the new invention), called "PMLMS"—This decoding method is also applicable to Collaborative MIMO, also known as Multi-User MIMO or Multiple-Access MIMO (which is a special case of Spatial-Multiplexing).

Benefit 4

For a Spatial-Multiplexing system that has 2 Tx antennas, and employs a receiver with a FEC decoder (FEC=forward-error correction code, e.g., Convolutional, Turbo-Code, LDPC; etc.) which admits Soft-Decision input metrics, then the decoding performance of this disclosed MIMO decoding invention with LLR Soft-Decision output metrics is optimum (best performance), i.e., it achieves a solution that is equal to the Maximum-Likelihood (ML) solution when LLR Soft-Decision output metrics are used. (It is understood that this performance is valid for a system with any number of Rx antennas.)

Benefit 5

For a Spatial-Multiplexing system that has more than 2 Tx antennas, and employs a receiver with a FEC decoder (FEC=forward-error correction code, e.g., Convolutional, Turbo-Code, LDPC, etc.) which admits Soft-Decision input metrics, then the decoding performance of this disclosed MIMO decoding invention with LLR Soft-Decision output metrics is less than the optimum Maximum-Likelihood (ML) performance when LLR Soft-Decision output metrics are used, but much better than that of the Full-MMSE or Zero-Forcing (Decorrelation) methods when LLR Soft-Decision output metrics are used. As the number of Tx antennas increases above 2, the performance decreases compared to ML (and the performance advantage compared to Full-MMSE or Zero-Forcing decreases), however, when LLR Soft-Decision output metrics are used, the performance degradation compared to ML is very small, especially in practical systems which use a relatively low number of Tx antennas, e.g., usually not more than 4 Tx antennas. It is emphasized that the present invention is not limited to any number of Tx antennas. (It is understood that this performance is valid for a system with any number of Rx antennas.)

Benefit 6

Claim 3, stated in the $1^{st}$ part of the invention disclosure, is hereby extended to the case of a MIMO decoder with Soft-Decision output metrics, namely: The computational complexity (number of calculations) is substantially less than that of the Maximum-Likelihood (ML) method with Soft-Decision output metrics. In general terms, for 2 Tx antennas the computational complexity grows linearly with the number of Tx antennas and linearly with the constellation size: $O(mM)=O(nM)$, and for more than 2 Tx antennas the computational complexity grows with the cube of the number of Tx antennas and linearly with the constellation size: $O(n^2 mM) \, O(n^3 M)$, where n is the number of Tx antennas, and is proportional to m, the number of Rx antennas: $m=\alpha \cdot n$ (e.g., m=5 Rx antennas, n=4 Tx antennas, $\alpha=1.25$), and M is the size of the largest constellation (the largest signaling alphabet): QPSK has M=4, 64-QAM has M=64, etc. Compare this to the computational complexity of ML with Soft-Decision output metrics, which is: $O(M^n)$. To emphasize, the exact computational complexity for more than 2 Tx antennas is $O(n^2 mM)$, however, in practical cases of interest, m and n are of the same order-of-magnitude, i.e., the proportionality factor $\alpha$ between m and n is not large, then it is valid to say that the complexity is: $O(n^2 mM)=O(n^3 M)$. Similarly, for 2 Tx antennas: $O(mM)=O(nM)$.

Benefit 7 (Also Relevant for $1^{st}$ Part)

The disclosed MIMO decoding invention (both with Hard-Decision outputs, described in the $1^{st}$ part, and with Soft-Decision output metrics, described in this $2^{nd}$ part) can support the case where the symbols from the different Tx antennas belong to different signal constellation sizes and shapes, i.e., the signaling alphabet and modulation type for symbols from the different Tx antennas may be different (e.g., symbols from the $1^{st}$ Tx antenna may be modulated as QPSK which has signaling alphabet size M=4, symbols from the $2^{nd}$ Tx antenna may be modulated as 64-QAM which has signaling alphabet size M=64, etc.). To emphasize, what is claimed is not a scheme of using different constellation sizes and shapes (different signaling alphabets and modulation types) for each of the Tx antennas; but rather, it is claimed that the disclosed MIMO decoding invention can indeed successfully support the case of different simultaneous signal constellation sizes and shapes. Such a situation is prevalent in Collaborative MIMO (also known as Multi-User MIMO or Multiple-Access MIMO), usually with so-called Horizontal Encoding, however, this claim is not limited to Collaborative MIMO, and the benefit and utility of the present invention can be applied in other situations and cases as well, with regard to different simultaneous signal constellation sizes and shapes.

Description of the Invention for Computation Reduction when Outputs are Hard-Decisions The $1^{st}$ part of the invention (in a separate document), reduces the computational complexity, with regard to more than 2 Tx antennas, from $O(M^n)$ for the Maximum-Likelihood (ML) method, to $O(n^4M)$ or $O(n^3M)$ using the invention, when the outputs are Hard-Decisions. This section of the $2^{nd}$ part of the invention shows how to ensure that the limit of $O(n^3M)$ is never exceeded when the outputs are Hard-Decisions.

In the $1^{st}$ part of the invention (concerned with Hard-Decision outputs), with regard to more than 2 Tx antennas, the principal computational complexity (number of calculations), occurs in 2 places:

1. In Phase 0, which describes methods and means for deciding which of the symbols shall be the "main symbol", especially the $1^{st}$ criterion alternative, which requires calculating the values of several matrix determinants. See Equation 54 below.
2. In Phase 2, which calculates a Zero-Forcing or MMSE solution using a reduced matrix $H_k$, and requires inverting a matrix. See Equation 55 below.

The relevant calculation descriptions are reproduced here for convenience. They make use of the definition of matrices Hj in Equation 53, which is equivalent to Equation 11 in the $1^{st}$ part document.

Equation 54 below is a reproduction of Equation 12 from the $1^{st}$ part document:

Criterion Alternative 1:

Phase 0 from $1^{st}$ Part for $n > 2$ Tx Antennas, Equation 54

Criterion Alternative 1

$$k = j_{main} = \arg\max_{j=1,\ldots,n} \{\det(H_j^H \cdot H_j)\},$$

det( ) is the matrix determinant

Equation 55 below is a reproduction of the relevant fragment extracted from Equation 15 from the $1^{st}$ part document:

Zero-Forcing: $\hat{s}_{without\,k}(i) = (H_k^H \cdot H_k)^{-1} \cdot H_k^H \cdot g_i$, $i=1,\ldots,M$ Equation 55: Fragment of Phase 2 from $1^{st}$ Part for n>2 Tx Antennas Note 1: It is observed that the successive decoding order originally described for V-BLAST in [17] is "strongest first" at each stage (see also [12]), whereas the decoding order described in the $1^{st}$ part of the invention with regard to Hard-Decision outputs is "weakest first", as given by Equation 54 above, which is a reproduction of Equation 12 from the $1^{st}$ part document. It is "weakest first" because the chosen criterion maximizes the decoding reliability of the symbols remaining after the "main symbol" has been canceled. This is also evident in the $2^{nd}$ criterion alternative for Phase 0, given by Equation 13 from the $1^{st}$ part document.

Note 2: In terms of performance, the $1^{st}$ criterion alternative for Phase 0 is to be preferred over the $2^{nd}$ criterion alternative for Phase 0 (given by Equation 13 from the $1^{st}$ part document). In terms of computational complexity, the $2^{nd}$ criterion alternative is obviously simpler to implement, however, the method and means shown below can improve the attractiveness of the $1^{st}$ criterion alternative with regard to computational complexity.

The following is a description of a method and means for ensuring that the computational complexity limit of $O(n^2mM) = O(n^3M)$ is never exceeded, with regard to a MIMO decoder with Hard-Decision outputs.

Pre-Processing Phase for Preferred Embodiment:

Perform the QR decomposition of the m×n matrix H:

[Q,R]=QRDecomposition(H)(Q and R are the QR decomposition of H)

Obtain a separate QR decomposition update for each one of the n matrices $H_j$:

$[Q_j,R_j]$=UpdateRemoveColumnQR$(Q,R,j), j=1,\ldots,n$

Note 1: These n separate updates are independent one of the other.

Note 2: The matrices $H_i$ are not actually necessary, so not computed nor stored.

Equation 56: Pre-Processing Phase for n>2 Tx Antennas

Where the operation $[Q_j,R_j]$=UpdateRemoveColumnQR$(Q,R,j)$ denotes the reduced computational complexity update of the QR decomposition with regard to removal of column j from matrix H. This operation has been described in the prior-art section entitled "Existing Methods for Computational Complexity Reduction (Prior Art)".

Preferred Embodiment of Phase 0, Criterion Alternative 1:

Criterion Alternative 1:

Preferred Embodiment of Phase 0 from 1st Part

Equation 57

For each of the $n$ matrices $R_j$, calculate the product of the absolute-values of its diagonal elements (the calculation is separate for each matrix $j$ out of the $n$):

$$\delta_j = \prod_{d=1,\ldots,n-1} |[R_j]_{d,d}|,$$

$j = 1, \ldots, n$ $([\bullet]_{d,d}$ denotes $d$th diagonal element)

Decide which of the $n$ symbols shall be the "main symbol" $k$ according to:

$$k = j_{main} = \arg\max_{j=1,\ldots,n} \{\delta_j\}$$

Note: In cases where $n$ is very large and/or the dynamic range of the diagonal elements is large, the following alternative embodiment shall be preferred:

$$\rho_j = \sum_{d=1,\ldots,n-1} \log(\varepsilon + |[R_j]_{d,d}|),$$

$j = 1, \ldots, n$ $([\bullet]_{d,d}$ is $d$th diagonal $elem$.)

$$k = j_{main} = \arg\max_{j=1,\ldots,n} \{\rho_j\}$$

$\varepsilon$ is a small positive number, e.g., $\varepsilon = 10^{-3}$.

It is observed that mathematically: $\delta_j = \sqrt{\det(H_j^H \cdot H_j)}$ and that the square-root does not affect the operation of the decision employing maximum, since it is a monotonously increasing function. Similarly, for the alternative embodiment using the logarithm.

Preferred Embodiment of Fragment of Phase 2:

Zero-Forcing: $\hat{s}_{without\,k}(i) = R_k^{-1} \cdot (Q_k^H \cdot g_i), i=1, \ldots, M$ $R_k^{-1}$ is performed using back-substitution.

Equation 58: Preferred Embodiment of Fragment of Phase 2 from 1st Part

It is understood that a similar method and means can be used to obtain the MMSE solution in the fragment of Phase 2, instead of the Zero-Forcing solution in the fragment of Phase 2, as described above.

It is understood that the SVD (singular-value decomposition), and the appropriate operation $[U_j, D_j, V_j]$=UpdateRemoveColumnSVD(U,D,V,j), can be used instead of the QR decomposition and the operation $[Q_j, R_j]$=UpdateRemoveColtannQR(Q,R,j) shown above.

Description of the Invention with Soft-Decision Output Metrics

This $2^{nd}$ part of the invention also extends the $1^{st}$ part (in a separate document), with regard to Soft-Decision output metrics.

A MIMO decoder that is able to output soft-decision metrics can provide a considerable performance advantage (compared to using hard-decision outputs) when subsequent FEC decoding (FEC=forward-error correction code, e.g., Convolutional, Turbo-Code, LDPC, etc.) is capable of admitting Soft-Decision input metrics. For this step, it is necessary to create LLR (log-likelihood ratio) values, or other Soft-Decision metrics, which indicate the confidence level for each bit in the decoded symbols.

The following are descriptions of a methods and means for enabling LLR Soft-Decision output metrics in the low-complexity high-performance MIMO decoder invention. Two embodiment alternatives are presented, followed by criteria for determining the preferred embodiment between the 2 alternative choices.

Specific Notation and Definitions

The descriptions shall deal with the cases of exactly 2 and more than 2 Tx antennas in a combined and unified manner, for generality of presentation. It is understood that in the special case of 2 Tx antennas, the computational complexity may be greatly reduced (e.g., matrix operations become vector operations, or even scalar operations).

The baseband signal model is written using vector-notation as: y=H·s+v, similarly to the examples shown in Equation 4. The dimension (length) of vector s and the width of channel-matrix H are n, where n is the number of Tx antennas in the system, and n≥2. It is understood that the mathematical notation is the same for a system with any number of Rx antennas. The following equations shall illustrate the case where the number m of Rx antennas is equal to or greater than the number n of Tx antennas: m≥n.

In the following descriptions, it is assumed that the transmitted symbols are $s_j$, j=1, . . . , n in the vector s. Furthermore, each symbol $s_j$ consists of a possibly different number of bits, according to its modulation. The combined group of bits from all symbols shall be denoted $[b_l]_{l=1,\ldots,n_B}$, with $n_B$ bits. For example, in a system with 2 Tx antennas, s1 (from the $1^{st}$ Tx antenna) is modulated as QPSK (signaling alphabet size $M_1$=4) and s2 (from the $2^{nd}$ $T_x$ antenna) is modulated as 64-QAM (signaling alphabet size $M_2$=64), then s1 consists of the 2 bits $b_1$, $b_2$ and s2 consists of the 6 bits $b_3, b_4, b_5, b_6, b_7, b_8$; the combined group of bits is: $[b_l]_{l=1,\ldots,n_B} = [b_1, b_2, b_3, b_4, b_5, b_6, b_7, b_8]$, $n_B$=8 bits. Note that enumerating the bits starting with l=1 (i.e., l=1, . . . , 8) instead of l=0 (i.e., l=0, . . . , 7) as customary in computer arithmetic, is not significant in the present disclosure. This specific example is for illustrational purposes only; the present invention is not limited to it.

Note: In a system with Horizontal Encoding (see definition in section "Definitions and Acronyms"), the bits within symbols transmitted from different Tx antennas will be destined (as soft-decision output metrics) to different FEC decoders at the receiver.

For simplicity of exposition, but without loss of generality, in the rest of this section it shall occasionally be assumed that the number of Tx antennas is n=4, for illustrational purposes only; the present invention is not limited to it. It is understood that the processing thus described is valid for any number of Tx antennas.

In the case of 4 Tx antennas, the baseband signal model equation can be written with separated channel-matrix columns as:

Development of Baseband Signal Equation

Equation 59

$$y = H \cdot s + v$$
$$= [h_1 \quad h_2 \quad h_3 \quad h_4] \cdot s + v$$
$$= h_1 s_1 + h_2 s_2 + h_3 s_3 + h_4 s_4 + v$$

where $h_1$ denotes the 1st column in $H$, $h_2$ denotes the 2nd column, etc.

For example, when there are 5 $Rx$ antennas:

$$h_1 = \begin{bmatrix} h_{11} \\ h_{21} \\ h_{31} \\ h_{41} \\ h_{51} \end{bmatrix}, h_2 = \begin{bmatrix} h_{12} \\ h_{22} \\ h_{32} \\ h_{42} \\ h_{52} \end{bmatrix}, h_3 = \begin{bmatrix} h_{13} \\ h_{23} \\ h_{33} \\ h_{43} \\ h_{53} \end{bmatrix}, h_4 = \begin{bmatrix} h_{14} \\ h_{24} \\ h_{34} \\ h_{44} \\ h_{54} \end{bmatrix}$$

Additionally, the following definition shall be necessary, and is equivalent to Equation 11 in the $1^{st}$ part; it is reproduced here for convenience.

Assume that the matrix H has dimensions 5×4 (m=5, n=4) for illustrational purposes, then a matrix Hj is defined as:

$H_j = [h_1 \ldots h_{j-1} h_{j+1} \ldots h_4]$

Examples:

$H_1 = [h_2 h_3 h_4]$, without $h_1$ $H_2 = [h_1 h_3 h_4]$, without $h_2$ $H_3 = [h_1 h_2 h_4]$, without $h_3$ $H_4 = [h_1 h_2 h_3]$, without $h_4$ Equation 60: Definition of Hj Therefore, all the matrices Hj shown above have dimensions 5×3.

Obviously, the specific dimensions shown here are only for illustrational purposes; the definition of the matrices $H_j$, j=1, . . . , n each of dimensions m×(n−1), are applicable to any m×n matrix H.

With the definition in Equation 60 above, it is possible to write Equation 59 also as:

$y = H \cdot s + v = h_j \cdot s_j + H_j \cdot s_{without\,j} + v$ where $s_{without\,j}$ denotes the vectors without the symbol $s_j$ i.e., the dimension of $s_{without\,j}$ is: (n−1)×1.

Note: There are n different possibilities for this equation, corresponding to the n possible values of j.
Equation 61: Another Form of Baseband Signal Equation
Pre-Processing Phase for Both Embodiment Alternatives
Pre-Processing Phase:
Perform the QR decomposition of the m×n matrix H

[Q,R]=QRDecomposition(H)(Q and R are the QR decomposition of H)

Obtain a separate QR decomposition update for each one of the n matrices $H_j$:

$[Q_j,R_j]$=UpdateRemoveColumnQR(Q,R,j), j=1,...,n

Note 1: These n separate updates are independent one of the other.
Note 2: The matrices $H_j$ are not actually necessary, so not computed nor stored.
Equation 62: Pre-Processing Phase
Where the operation $[Q_j,R_j]$UpdateRemoveColumnQR(Q,R,j) denotes the reduced computational complexity update of the QR decomposition with regard to removal of column j from matrix H. This operation has been described in the prior-art section entitled "Existing Methods for Computational Complexity Reduction (Prior Art)".

It is understood that the SVD (singular-value decomposition), and the appropriate operation $[U_j,D_j,V_j]$=UpdateRemoveColumnSVD(U,D,V,j), can be used instead of the QR decomposition and the operation $[Q_j,R_j]$=(UpdateRemoveColumnQR(Q,R,j) shown above.

Note: The pre-processing phase described above is valid for n≥2, however, in the special case of 2 Tx antennas, performing the following operations may reduce the computational complexity:

For n=2 Tx antennas:
The QR decomposition of the m×n matrix H is not performed at all.
$R_j$ and $Q_j$ are obtained directly by:

Simplified Pre-Processing Phase for n = 2 Tx Antennas

Equation 63

$R_1 = r_1 = \|h_2\| = \sqrt{h_2^H \cdot h_2}$, $R_2 = r_2 = \|h_1\| = \sqrt{h_1^H \cdot h_1}$ $Q_1 = q_1 = h_2/r_1$, $Q_2 = q_2 = h_1/r_2$ Embodiment Alternative 1
It is assumed (as a pre-requisite requirement) that the Pre-Processing Phase in Equation 62 above has already been performed, and its results are available.

The following description is written for simplicity of exposition, however, it shall be understood (by those versed in the art) that some operations are independent of others, and can therefore be performed separately, in parallel. For example, in the following description all calculations with regard to the j-th symbol $s_j$ (out of the n symbols) are independent of the calculations for the other symbols; therefore, the calculation with regard to different symbols (for each j) can be performed separately, in parallel to the calculations for the other symbols.

Phase 1:
For each symbol $s_j$ (the j-th vector-element component of vector s), and for all its $M_j$ possible values (for example, 64-QAM has $M_j$=64), calculate the following vector values:

Phase 1 of Alternative 1 of PMLMS with Soft-Decisions

Equation 64

For each $j = 1, ..., n$:

$g_{j,i} = g(s_j(i)) = y - h_j \cdot s_j(i), i = 1, ..., M_j$

Note: The total number of calculated vector values is:

$$\sum_{j=1,...,n} M_j = M_1 + ... + M_n$$

If all n symbols have equal alphabet sizes: $M_j = M, \forall j$, then the total number vector values will be: $nM$.

Phase 2:
For the vectors $g_{j,i}$ calculated in Phase 1, calculate:

Phase 2 of Alternative 1 of PMLMS with Soft-Decisions

Equation 65

For each $j = 1, ..., n$:

Zero-Forcing $\hat{s}_{without\ j}(i) = (H_j^H \cdot H_j)^{-1} \cdot H_j^H \cdot g_{j,i}, i = 1, ..., M_j$
$= R_j^{-1} \cdot (Q_j^H \cdot g_{j,i}), i = 1, ..., M_j$ or:

MMSE: $\hat{s}_{without\ j}(i) = (H_j^H \cdot H_j + \sigma^2 I)^{-1} \cdot H_j^H \cdot g_{j,i}, i = 1, ..., M_j$
= similar using QR decomposition, $i = 1, ..., M_j$ $s_{without\ j}(i) = HardDecision(\hat{s}_{without\ j}(i))$ $s_{j,i}$ is a vector created from the symbol $s_j(i)$, and the symbol vector-element components within the vector $s_{without\ j}(i)$, such that each symbol vector-element component will occupy its correct position within the vector $s_{j,i}$.

There are $M_j$ vectors $s_{j,i}(i = 1, ..., M_j)$

End of "for each j" block.

Note: $R_j^{-1}$ is performed using back-substitution.

The preferred embodiment using QR decomposition.

In the MMSE method, $\sigma^2$ is the noise+interference variance (power), with any compensation factor.

In the equations above, s=HardDecision($\hat{s}$) means: Given an input vector-point $\hat{s}$, which is any vector-point with contiguous values, find the closest vector-point s whose vector-element components belong to the constellations (the signaling alphabets) of each of the vector-element components. (The constellation of each of the vector-element components has a discrete set of finite number of values, for example: QPSK, 16-QAM, 64-QAM, etc.) This operation is well-known in the communications literature.

It is understood that the Zero-Forcing or MMSE partial estimations can be computed using SVD (singular-value decomposition), instead of the QR decomposition shown above. This requires that the Pre-Processing Phase in Equation 62 above performs SVD updates rather than QR updates.

Phase 3:
Clarification explanation: Each symbol $s_j$ (the j-th vector-element component of vector s) consists of $n_B(j)=\log_2(M_j)$ bits $[b_l]$ out of the total of $n_B$ bits within the complete vector s. For each specific bit/within symbol $s_j$, half of the $M_j$ possible values of symbol $s_j$ will have $b_l=0$, and half of them will have $b_l=1$. Because the vectors $s_{j,i}$ calculated in Phase 2 for each specific value of j where created using all $M_j$ possible values of symbol $s_j$, then for each specific value of j, half of the vectors $s_{j,i}$ will have $b_l=0$, and half of them will have $b_l=1$.

The following definition is based on the preceding clarification explanation:

For each specific value of j, denote the j-th subset of vectors $s_{j,i}$ with $b_l=0$ as: $\{s_{j,i}(b_l=0)\}$, and denote the j-th subset of vectors $s_{j,i}$ with $b_l=1$ as: $\{s_{j,i}(b_l=1)\}$. Each of these 2 non-overlapping subsets has $M_j/2$ different vectors.

Equation 66: Definition of Subsets of Vectors with Bit-Values 0 and 1

The LLR Soft-Decision output metrics for bits $[b_l]$ are calculated using the vectors $s_{j,i}$ calculated in Phase 2, as:

Phase 3 of Alternative 1 of *PMLMS* with Soft-Decisions

Equation 67

For each $j = 1, \ldots, n$:

For bits $b_l$ within symbol $s_j$:

$\gamma_l(0) =$ $\min_{s_{j,i}:b_l=0} \{\|y - H \cdot s_{j,i}(b_l = 0)\|^2\}$ with *j*th subset of $s_{j,i}$ that have $b_l = 0$ $\gamma_l(1) =$ $\min_{s_{j,i}:b_l=1} \{\|y - H \cdot s_{j,i}(b_l = 1)\|^2\}$ with *j*th subset of $s_{j,i}$ that have $b_l = 1$ Note: There are $(M_j/2)$ vectors in each of the 2 non-overlapping subsets $\{s_{j,i}(b_l = 0)\}$ and $\{s_{j,i}(b_l = 1)\}$.

See their definition.

$LLR_l \cong \frac{1}{\sigma^2}(\gamma_l(0) - \gamma_l(1)),$ is the Max-Log *LLR* for bit *l*

$\sigma^2$ can be neglected, because the same for all bits.

End of "for each $j$" block.

$\|\cdot\|^2$ is the squared Euclidean vector norm $H$ is the $m \times n$ channel-matrix, and $y$ is the received $m \times 1$ signal vector.

Embodiment Alternative 2

It is assumed (as a pre-requisite requirement) that the Pre-Processing Phase in Equation 62 above has already been performed, and its results are available.

Step A:

Perform the operations for obtaining the MIMO decoding with Hard-Decisions, as described in the 1$^{st}$ part of the invention (in a separate document), noting that Hard-Decision processing for more than 2 Tx antennas (n>2) is different than for 2 Tx antennas (n=2), and making use of the following preferred embodiments described in this 2$^{nd}$ document:

Equation 57: Preferred Embodiment of Phase 0 from 1st Part, and:

Equation 58: Preferred Embodiment of Fragment of Phase 2 from 1st Part.

The outputs from this processing step are the following outputs from the Hard-Decision estimation:

The index k of the "main symbol", and:

The Hard-Decision estimation of the symbol $s_k$ (which is the k-th vector-element component of the Hard-Decision estimation output vector $s_{PMLMS, Hard-Decision}$).

Step B:

Perform the operations similarly to the description above for Embodiment Alternative 1 of MIMO decoding with Soft-Decisions (in this 2$^{nd}$ document), with the following restriction: each of the Phases 1, 2, and 3 shall not be performed over all n symbols $j=1, \ldots, n$, but rather only for the single symbol $s_k$, i.e., for a single symbol with index $j=k$, where k is the "main symbol" obtained in Step A above.

The outputs from this processing step are the final LLR Soft-Decision output metrics for the bits within symbol $s_k$. The symbol $s_k$ consists of $n_B(k)=\log_2(M_k)$ bits $[b_l]$ out of the total of $n_B$ bits within the complete vector s, therefore, there are $n_B(k)=\log_2(M_k)$ LLR metrics as outputs from this step.

Step C:

Define a new received signal vector v new, and a new $m \times (n-1)$ channel-matrix $H_{new}$ with its associated decomposition and sub-matrices:

$y_{new}=y-h_k \cdot s_k$ index $k$ and estimation $s_k$ are outputs from Step A $H_{new}=H_k=$matrix $H$ without column $h_k$ $Q_{new}=Q_k$ $R_{new}=R_k$ where $Q_k$ and $R_k$ are the QR decomposition of $H_k$ which were available prior Step A as a pre-requisite requirement (together with the other $Q_j$ and $R_j$, $j=1, \ldots, n$).

$H_{new,j}=$matrix $H_{new}$ without its *j*th column $h_{new,j}$, $j=1, \ldots, n-1$ Equation 68: Definition of New Received Vector and Channel-Matrix Perform the Following Updates:

Obtain a separate QR decomposition update for each one of the n−1 matrices $H_{new,j}$:

$[Q_{new,j}, R_{new,j}]=$UpdateRemoveColumnQR$(Q_{new}, R_{new}, j), j=1, \ldots, n-1$ Note 1: These n−1 separate updates are independent one of the other.

Note 2: The matrices $H_{new,j}$ are not necessary, so not computed nor stored.

Equation 69: New Decomposition Updates

Where the operation $[Q_{new,j}, R_{new,j}]=$UpdateRemoveColumnQR$(Q_{new}, R_{new,j})$ denotes the reduced computational complexity update of the QR decomposition with regard to removal of column j from matrix $H_{new,j}$. This operation has been described in the prior-art section entitled "Existing Methods for Computational Complexity Reduction (Prior Art)".

It is understood that SVD (singular-value decomposition) updating operations can be used instead of the QR updating operations, as indicated below Equation 62.

Also note that in the special case of n=3 Tx antennas, the channel-matrix $H_{new}$ will have 2 columns, and therefore the simplified processing in Equation 63 could therefore be applied to $H_{new}$, instead of Equation 69.

Step D:

Perform the operations similarly to the description above for Embodiment Alternative 1 of MIMO decoding with Soft-Decisions (in this 2$^{nd}$ document), applying Phases 1, 2, and 3 with the difference that all processing is performed on the new vector $y_{new}$, the new $m \times (n-1)$ channel-matrix $H_{new}$, and the new updated decompositions $Q_{new,j}$ and $R_{new,j}$, $j=1, \ldots, n-1$ (instead of y, H, $Q_j$ and $R_j$, $j=1, \ldots, n$). Note that since $H_{new}$ has n−1 columns, then the index j in Phases 1, 2, and 3 will count up to n−1 (instead of up to n).

The outputs from this processing step are the final LLR Soft-Decision output metrics for the bits within the complete vector s except for the LLR metrics for the bits within symbol $s_k$, which have already been obtained in Step B above. The number of LLR output metrics in this step is $n_B-n_B(k)=n_B-\log_2(M_k)$ out of the total of $n_B$ for the complete vector s. Therefore, the outputs from Step B together with those from the current Step D provide all $n_B$ of the required LLR Soft-Decision output metrics.

Obviously, it may be required to arrange the LLR Soft-Decision output metrics from Step B together with those from the current Step D within a common output vector, buffer, or any other type of memory structure or interface mechanism.

Preferred Embodiment

The following criteria determine the preferred embodiment between the 2 alternative choices presented above.

Embodiment Alternative 1 should be preferred when either one (or both) of the following 2 criteria is valid:
When the MIMO decoder in a specific receiver is intended to be simple to implement.
When the complete system has 2 Tx antennas.

Embodiment Alternative 2 should be preferred when the following combined criterion is valid:
When the complete system has more than 2 Tx antennas, and when the MIMO decoder in a specific receiver operating within this system is intended to provide the best possible performance.

The reason for the preferences above, is based on the following assertions:
1. Alternative 1 is simpler to implement than Alternative 2.
2. Alternative 1 and Alternative 2 both provide similarly optimum performance in a system that has 2 Tx antennas, in terms of bit error-rate (BER) performance.
3. Alternative 2 provides better performance than Alternative 1 in a system that has more than 2 Tx antennas, in terms of bit error-rate (BER) performance.

It will be recognized that the foregoing is but one example of a system and method within the scope of the present invention and that various modifications will occur to those skilled in the art upon reading the disclosure set forth hereinbefore.

The invention claimed is:

1. A method for decoding Spatial-Multiplexing MIMO in a system with 2 transmit (Tx) antennas, the method comprising the steps of:
(a) representing a baseband signal model using vector-notation as: y=Hs+v, wherein, in the case of a system with 2 Tx antennas, the equation can be written with separated channel-matrix columns;
(b) for all M possibilities of the $1^{st}$ symbol vector-element component $s_1$ in vector s, calculating the following M vector values:

$$g_1=g(s_1(i))=y-h_1s_1(i), i=1,\ldots,M$$

(c) for the vectors g, calculated in step (b), calculating:

$$\text{Zero-Forcing } \hat{s}_2(i) = \frac{1}{\|h_2\|^2} h_2^H \cdot g_i, i=1,\ldots M, \|h_2\|^2 = h_2^H \cdot h^2$$

or:

$$\text{MMSE: } \hat{s}_2(i) = \frac{1}{\|h_2\|^2+\sigma^2} h_2^H \cdot g_i, i=1,\ldots M, \|h_2\|^2 = h_2^H \cdot h^2$$

$$s_2(i) = HardDecision(\hat{s}_2(i))$$

$$s_i = \begin{bmatrix} s_1(i) \\ s_2(i) \end{bmatrix}, i=1,\ldots,M$$

(d) for the vectors $s_i$ calculated in step (c), finding the one that attains the minimum value of the Euclidean vector norm of the error which mathematically, this phase can be expressed as:

$$s_{PMLMS} = \arg\min_{s_i:i=1,\ldots,M} \{\|y-H\cdot s_i\|^2\} \text{ is the PMLMS solution}$$

Where $\|\bullet\|^2$ is the squared Euclidean vector norm.

$\|v\|^2 = v^H \cdot v$ is real and non-negative and $\arg\min_{s_i:i=1,\ldots,M}\{\}$ means:

to search for the minimum over all

M possibilities of the vectors $s_i(i=1,\ldots,M)$.

2. The method for decoding Spatial-Multiplexing MIMO according to claim 1, wherein s=HardDecision(ŝ) wherein, given an input point ŝ, which is any point with contiguous values, finding the closest points that belongs to the constellation (the signaling alphabet).

3. The method for decoding Spatial-Multiplexing MIMO according to claim 1, wherein, in order to prepare the decoded symbols for subsequent FEC decoding or Turbo-Code, or LDPC, further comprising the step of creating LLR (log-likelihood ratio) values, or other soft-decision metrics, which indicate the confidence level for each bit in the decoded symbols.

4. The method for decoding Spatial-Multiplexing MIMO according to claim 1, wherein in step (c), either one of the terms $$\frac{1}{\|h_2\|^2} h_2^H \text{ or } \frac{1}{\|h_2\|^2+\sigma^2} h_2^H$$

which multiply the vectors $g_i$ (in either the Zero-Forcing or MMSE method, respectively), is calculated only once, at the beginning of step (c).

5. The method for decoding Spatial-Multiplexing MIMO according to claim 4, wherein s=HardDecision(ŝ) wherein, given an input point ŝ, which is any point with contiguous values, finding the closest points that belongs to the constellation (the signaling alphabet).

6. A method for decoding Spatial-Multiplexing MIMO in a system with more than 2 transmit (Tx) antennas, comprising:
(a) choosing one of a plurality of symbols $s_1, s_2, S_3, s_4$ to be the main symbol, the main symbol's index being denoted by k or $j_{main}$, using one of the criteria selected from a group of criteria including:
criterion 1:

$$k = j_{main} = \arg\min_{aj=1,\text{,}Arg}\{\det(H_j^H j \cdot H_j)\},$$

det( ) is the matrix determinant
and
criterion 2:

$$k = j_{main} = \arg\min_{aj=1,\text{,}Arg}\{\|h_j\|^2\}, \|h_j\|^2 = H_j^H \cdot j \cdot H_j$$

(b) for all M possibilities of the main symbol vector-element component $s_k$ in vector s, calculating the following M vector values:

$$g_i = g(s_k(i)) = y - h_k \cdot s_k(i), i=1, \ldots, M$$

(c) for the vectors $g_j$ calculated in step (b), calculate:

Zero-Forcing: $\hat{s}_{without\,k}(i) = (H_k^H H_k)^{-1} \cdot H_k^H \cdot g_i$, $i=1,\ldots,M$ or:

MMSE: $\hat{s}_{without\,k}(i) = (H_k^H H_k + \sigma^2 I)^{-1} \cdot H_k^H \cdot g_i$, $i=1,\ldots,M$ $\hat{s}_{without\,k}(i) = \text{HardDEcisions}(\hat{s}_{without\,k}(i))$ $s_i$ is a vector created from the main symbol $s_k(i)$, and the symbol vector—element components within the vector $s_{without\,k}(i)$, such that each symbol vector—element component will occupy its correct position within the vector s.sub.i.

There are M vectors $s_i$ (i=1, ..., M) and (d) for the vectors $s_i$ calculated in step (b), finding the one that attains the minimum value of the Euclidean vector norm of the error, as:

$$s_{PMLMS} = \arg\min_{s_i: i=1,\ldots,M} \{\|y - H \cdot s_i\|^2\} \text{ is the } PMLMS \text{ solution}$$

where $\|\bullet\|^2$ is the squared Euclidean vector norm:

$\|v\|^2 = v^H \cdot v$ is real and non-negative and $\arg\min_{s_i: i=1,\ldots,M} \{\}$ means:

to search for the minimum over all

M possibilities of the vectors $s_i (i = 1, \ldots, M)$.

7. The method for decoding Spatial-Multiplexing MIMO according to claim 6, wherein in step (c), in order to prepare the decoded symbols for subsequent FEC decoding, creating LLR values, or other soft-decision metrics, which indicate the confidence level for each bit in the decoded symbols.

8. The method for decoding Spatial-Multiplexing MIMO according to claim 6, wherein, in step (b), one of the terms $(H_k^H \cdot H_k)^{-1} \cdot H_k^H$ or $)=(H_k^H \cdot H_k + \sigma^2 I)^{-1} \cdot H_k^H$ which multiply the vectors $g_i$ (in either the Zero-Forcing or MMSE method, respectively), is calculated only once, at the beginning of step (b).

9. The method for decoding Spatial-Multiplexing MIMO according to claim 6, wherein, in the MMSE method, $\sigma^2$ is the noise+interference variance (power), with any compensation factor.

10. The method for decoding Spatial-Multiplexing MIMO according to claim 6, wherein, in step (b) the term $\hat{s} = \text{HardDecision}(g)$, wherein an input vector-point $\hat{s}$, which is any vector-point with contiguous values, finding the closest vector-point s whose vector-element components belong to the constellations (the signaling alphabets) of each of the vector-element components, wherein the constellation of each of the vector-element components has a discrete set of finite number of values.

11. The method for decoding Spatial-Multiplexing MIMO according to claim 6, wherein, in the case of 4 Tx antennas, the equation can be represented with separated channel-matrix columns as:

$$y = H \cdot s + v$$
$$= [h_1 \; h_2 \; h_3 \; h_4] \cdot s + v$$
$$= h_1 s_1 + h_2 s_2 + h_3 s_3 + h_4 s_4 + v$$

where $h_1$ denotes the 1st column in $H$, $h_2$ denotes the 2nd column, etc.

For example, when there are 4$Rx$ antennas:

$$h_1 = \begin{bmatrix} h_{11} \\ h_{21} \\ h_{31} \\ h_{41} \end{bmatrix}, h_2 = \begin{bmatrix} h_{12} \\ h_{22} \\ h_{32} \\ h_{42} \end{bmatrix}, h_3 = \begin{bmatrix} h_{13} \\ h_{23} \\ h_{33} \\ h_{43} \end{bmatrix}, h_4 = \begin{bmatrix} h_{14} \\ h_{24} \\ h_{34} \\ h_{44} \end{bmatrix}$$

12. The method for decoding Spatial-Multiplexing MIMO according to claim 10, wherein said discrete set of finite number of values is selected from the group comprising QPSK, 16-QAM, 64-QAM.

* * * * *